United States Patent
Baechler et al.

[11] Patent Number: 6,105,998
[45] Date of Patent: *Aug. 22, 2000

[54] BABY STROLLER

[75] Inventors: Philip A. Baechler, Yakima; Martin E. Valdez, Wapato, both of Wash.

[73] Assignee: Racing Strollers, Inc., Yakima, Wash.

[ * ] Notice: This patent is subject to a terminal disclaimer.

[21] Appl. No.: 09/040,656

[22] Filed: Mar. 17, 1998

Related U.S. Application Data

[63] Continuation-in-part of application No. 08/901,467, Jul. 28, 1997, abandoned.

[51] Int. Cl.$^7$ .............................. B62B 7/00; B62B 1/60; B62D 61/06
[52] U.S. Cl. .................. 280/650; 280/658; 280/47.38; 280/62
[58] Field of Search ................. 280/62, 650, 658, 280/642, 641, 47.38, 644, 38; 297/130

[56] References Cited

U.S. PATENT DOCUMENTS

| | | | |
|---|---|---|---|
| D. 297,525 | 9/1988 | Baechler | D12/129 |
| D. 370,438 | 6/1996 | Haut et al. | D12/129 |
| D. 371,094 | 6/1996 | Hinkston | D12/129 |
| 4,953,880 | 9/1990 | Sudakoff et al. | 280/47.38 |
| 5,188,389 | 2/1993 | Baechler et al. | 280/650 |
| 5,460,399 | 10/1995 | Baechler et al. | 280/650 |
| 5,468,009 | 11/1995 | Eyman et al. | 280/650 |
| 5,476,275 | 12/1995 | Baechler et al. | 280/47.38 |
| 5,522,614 | 6/1996 | Eyman et al. | 280/642 |
| 5,536,033 | 7/1996 | Hinkston | 280/642 |
| 5,558,357 | 9/1996 | Wang | 280/647 |
| 5,562,300 | 10/1996 | Nelson | 280/655.1 |
| 5,590,896 | 1/1997 | Eichhorn | 280/642 |
| 5,611,560 | 3/1997 | Thimmig | 280/642 |
| 5,669,624 | 9/1997 | Eichhorn | 280/642 |
| 5,683,096 | 11/1997 | Zonka | 280/642 |
| 5,695,212 | 12/1997 | Hinkston | 280/642 |
| 5,863,061 | 1/1999 | Ziegler et al. | 280/642 |
| 5,887,889 | 3/1999 | Andrus | 280/642 |

*Primary Examiner*—Lanna Mai
*Assistant Examiner*—Jeff Restifo
*Attorney, Agent, or Firm*—Seed IP Law Group PLLC

[57] ABSTRACT

A foldable baby stroller having left and right side front wheel supports with a front wheel mounted to a forward end, and a laterally extending rear axle with a rear wheel mounted to each end. The stroller has left and right side rear wheel supports, each with a lower end attached to the rear axle; and left and right side handle supports with a handle spanning between them. The stroller has left and right side folding assemblies, each having a pair of mounting plates and a guide pivotally attached therebetween. Each folding assembly has a rearward end of one of the front wheel supports fixedly attached between the plates. A forward end of one of the handle supports is pivotally attached between the plates and rotatable relative to the front wheel support. An upper end portion of one of the rear wheel supports is positioned between the plates with an upper end being pivotally attached to the forward end of the corresponding handle support for application of a drive force thereto by the handle support. The guide has an aperture with one of the rear wheel supports slidably disposed therein. The guide and guide aperture are configured to rotate the rear wheel support and to also slide the rear wheel support in the guide aperture in response to rotation of the corresponding handle support. Alternative style guides can also be used.

104 Claims, 8 Drawing Sheets

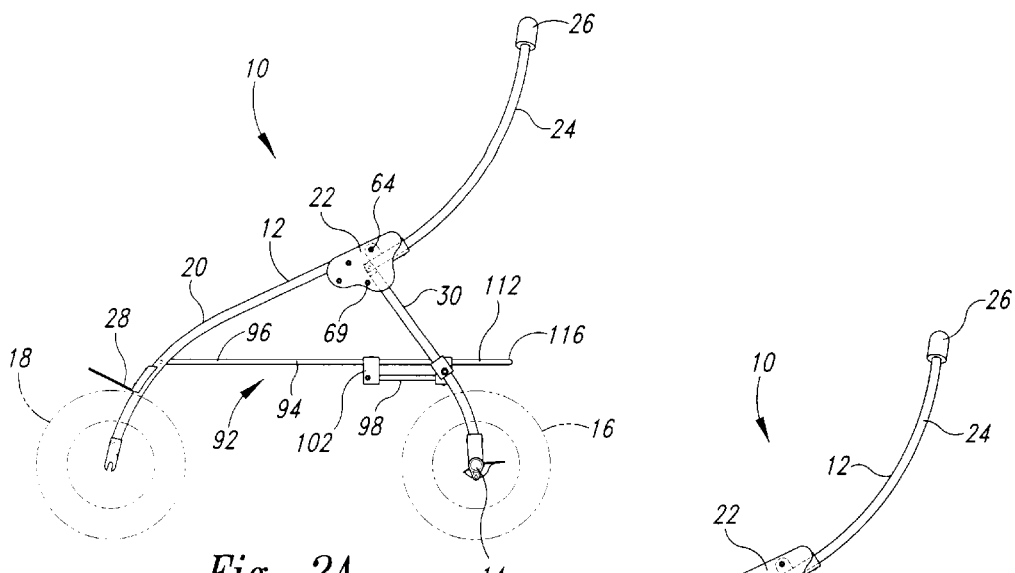
*Fig. 2A*
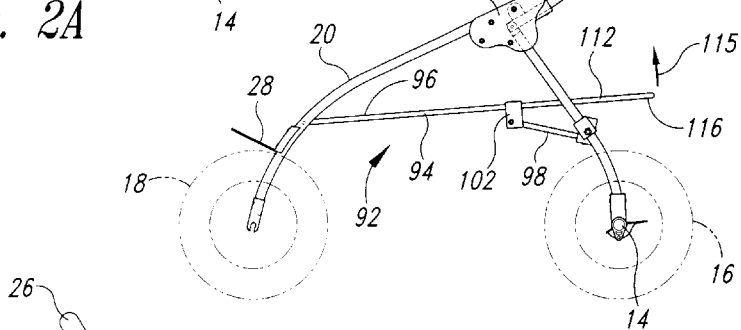
*Fig. 2B*
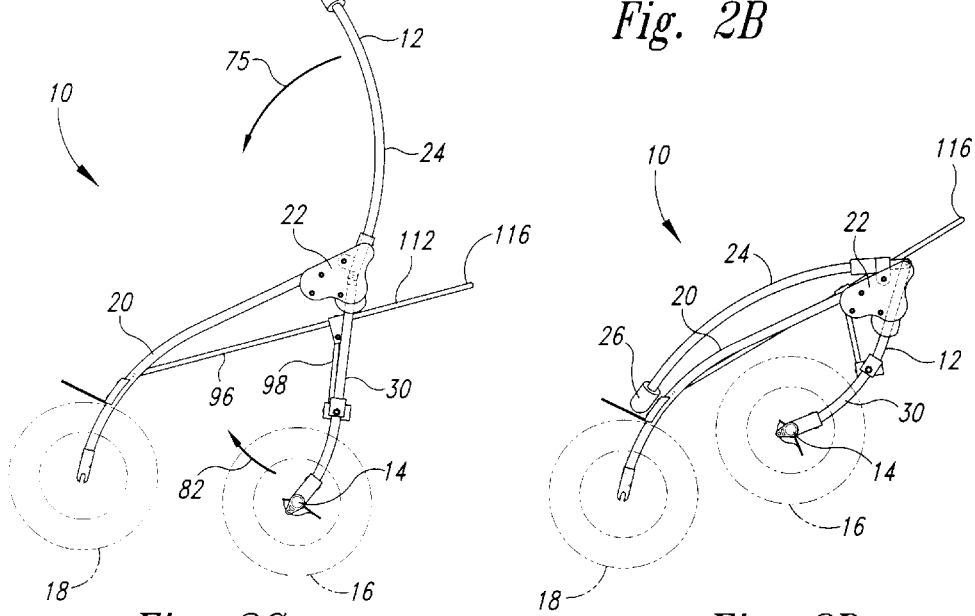
*Fig. 2C*     *Fig. 2D*

BABY STROLLER

CROSS-REFERENCE TO RELATED APPLICATION

This application is a continuation-in-part of U.S. patent application No. 08/901,467, filed Jul. 28, 1997, now abandoned.

TECHNICAL FIELD

The present invention relates to baby strollers, and more particularly, to all-terrain baby strollers that can be folded.

BACKGROUND OF THE INVENTION

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

As parents have become more health conscious in recent times, jogging and fast walking has become a popular pastime. Because baby strollers were not designed to be operated at high speed or on rough terrain, parents could jog or walk fast only when another person was available to baby-sit. As any parent knows, it is not always easy to find baby-sitters, so the ability of the parent to stay in shape by jogging or fast walking was severely limited.

Even for non-jogging parents, the need for an improved baby stroller has been apparent. The small, plastic wheels customarily used for baby strollers are almost useless when it is desired to walk with an infant in a grassy park or on a rough road or sidewalk. Parents end up not walking with the infant at all or only walking in limited areas.

All-terrain baby strollers have been designed to overcome these problems. These strollers typically employ much larger wheels, often large bicycle tires. The stroller frame members are constructed of metal tubular stock and durable plastic frame connectors are used to connect the frame members together to provide the stroller with a construction that is strong enough to handle the heavy duty use they may receive. The frame connectors are used to connect some frame members to others, sometimes while allowing one frame member to rotate or pivot relative to the other, and are used to removably connect other frame members together.

It is desirable to design an all-terrain stroller so that it folds for transportation and storage, especially in the trunk of a car. The all-terrain stroller preferably folds into a very compact configuration or envelope with a small or folded size as possible to facilitate its transportation and storage. It is also desirable to have the all-terrain stroller fold easily and quickly, preferably requiring use of only a single hand so that the other hand of the user is free to perform other tasks. Additionally, it is preferred that the folding can be accomplished by persons with little physical strength or mechanical skills, and without the use of tools. Of course, it is desirable to allow unfolding without requiring tools, or great strength or mechanical skills on the part of the user. Preferably, the unfolding can be accomplished easily and quickly, requiring use of only a single hand of the user.

It is further desirable to design the all-terrain stroller so that its folded size is sufficiently small that the disassembly of wheels from the stroller frame is unnecessary, and thus their reattachment when unfolded prior to the next use is avoided. Preferably, no frame members must be disconnected from each other to fold the all-terrain stroller. Similarly, it is desirable that the folded size is sufficiently small that the folded stroller can be conveniently and economically shipped in a box without the wheels being disassembled from the stroller frame or the frame members disconnected from each other. Not only does this reduce the time and hence cost involved in preparing an all-terrain stroller for shipment by the manufacturer and its distributors, and reduce the cost of shipping, but the retail sellers of the all-terrain stroller do not have to spend time and effort assembling the stroller before sale and purchasers do not have to assemble the stroller before each use.

The present invention provides an all-terrain stroller with all of these desired capabilities and features.

SUMMARY OF THE INVENTION

A foldable baby stroller frame for use with at least one front wheel and at least one rear wheel. The frame includes left and right side laterally spaced-apart front wheel supports. Each of the left and right side front wheel supports having a forward end and a rearward end. The forward ends of the front wheel supports having a mounting portion configured for mounting of the at least one front wheel thereto. The frame also includes left and right side laterally spaced-apart rear wheel supports. Each of the left and right side rear wheel supports has a lower end and an upper end. The lower ends having a mounting portion configured for mounting of the at least one rear wheel thereto. The left and right side rear wheel supports are rotatable as a unit. The frame further includes left and right side laterally spaced-apart handle members. Each of the left and right side handle members has a forward end and a rearward end. The left and right side handle members are rotatable as a unit.

Left and right side laterally spaced-apart folding assemblies are also included. Each of the left and right side folding assemblies has the forward end of a corresponding one of the left and right side handle members pivotally attached for rotation relative to a corresponding one of the left and right side front wheel supports as the left and right side handle supports rotate as a unit from an unfolded position extending rearwardly and upwardly from said folding assemblies to a folded position extending forwardly from the folding assemblies and adjacent to the front wheel supports. Each of the left and right side folding assemblies further have the upper end of a corresponding one of the left and right side rear wheel supports pivotally attached for rotation relative to a corresponding one of the left and right side front wheel supports as the left and right side handle members rotate as a unit from the unfolded position to the folded position. Each of the left and right side folding assemblies transmits a driving force from the corresponding handle member to the corresponding rear wheel support to rotate the corresponding rear wheel support during rotational movement of the corresponding handle member. The rotation of the rear wheel supports moving the rear wheel supports as a unit from an unfolded position extending rearwardly and downwardly from the folding assemblies to a folded position extending forwardly from the folding assemblies and adjacent to the front wheel supports.

In a preferred embodiment, the frame is for use with at least one front wheel and at least one rear wheel. The frame includes left and right side laterally spaced-apart first members, each of the first members having a first end portion and a second end portion; left and right side laterally spaced-apart second members, each of the second members having a first end portion and a second end portion; and left and right side laterally spaced-apart third members, each of the third members having a first end portion and a second end portion. One of the first end portions of a first one of the first, second and third members having a mounting portion configured for mounting of the at least one front wheel thereto; one of the first end portions of a different second one of the first, second and third members having a mounting portion configured for mounting of the at least one rear wheel thereto; and one of the first end portions of a yet different third one of the first, second and third members having a handle portion.

The frame further includes left and right side laterally spaced-apart first couplers. Each of the first couplers is attached to a corresponding one of the first members to permit the corresponding first member to rotate about the second end thereof relative to a corresponding one of the second members between a folded position and an unfolded position. Left and right side laterally spaced-apart second couplers are also included. Each of the second couplers operatively connects the corresponding first member and a corresponding one of the third members to transmit a driving force from the corresponding first member to the corresponding third member as the corresponding first member rotates between the folded position and the unfolded position thereof. Finally, left and right side laterally spaced-apart third couplers are included. Each of the third couplers is attached to the corresponding third member and retain the corresponding third member for both rotational movement about the second end portion thereof and linear movement relative to the corresponding second member in response to the driving force transmitted thereto by the corresponding first member as the corresponding first member rotates between the folded position and the unfolded position thereof. This results in both a rotational movement and a linear movement of the corresponding third member. The resulting rotational and linear movements of the corresponding third member moving said corresponding third member between an unfolded position and a folded position.

In one embodiment, the folding assemblies each include a guide which guides the corresponding third member for both rotational and linear movement relative to the corresponding second member in response to the driving force transmitted to the third member by the corresponding first member. The guide can take the form of a pivoting member with an aperture through which the third member slidably extends, a stationary guide surface against which the third member slides or a roller which the third member rollably engages while being retained and guided thereby.

Other features and advantages of the invention will become apparent from the following detailed description, taken in conjunction with the accompanying drawings.

BRIEF DESCRIPTION OF THE DRAWINGS

FIG. 2A is a left side view of the fully unfolded stroller frame of FIG. 1B.

FIG. 2B is a left side view of the stroller frame of FIG. 2A with a latch in an unlatched position in preparation for folding of the stroller.

FIG. 2C is a left side view of the stroller frame of FIG. 2A in a partially folded state with the handle portion and rear wheel supports moved forward for closing about the front wheel supports.

FIG. 2D is a left side view of the stroller frame of FIG. 2A in a fully folded state.

DETAILED DESCRIPTION OF THE INVENTION

Figure 1A:
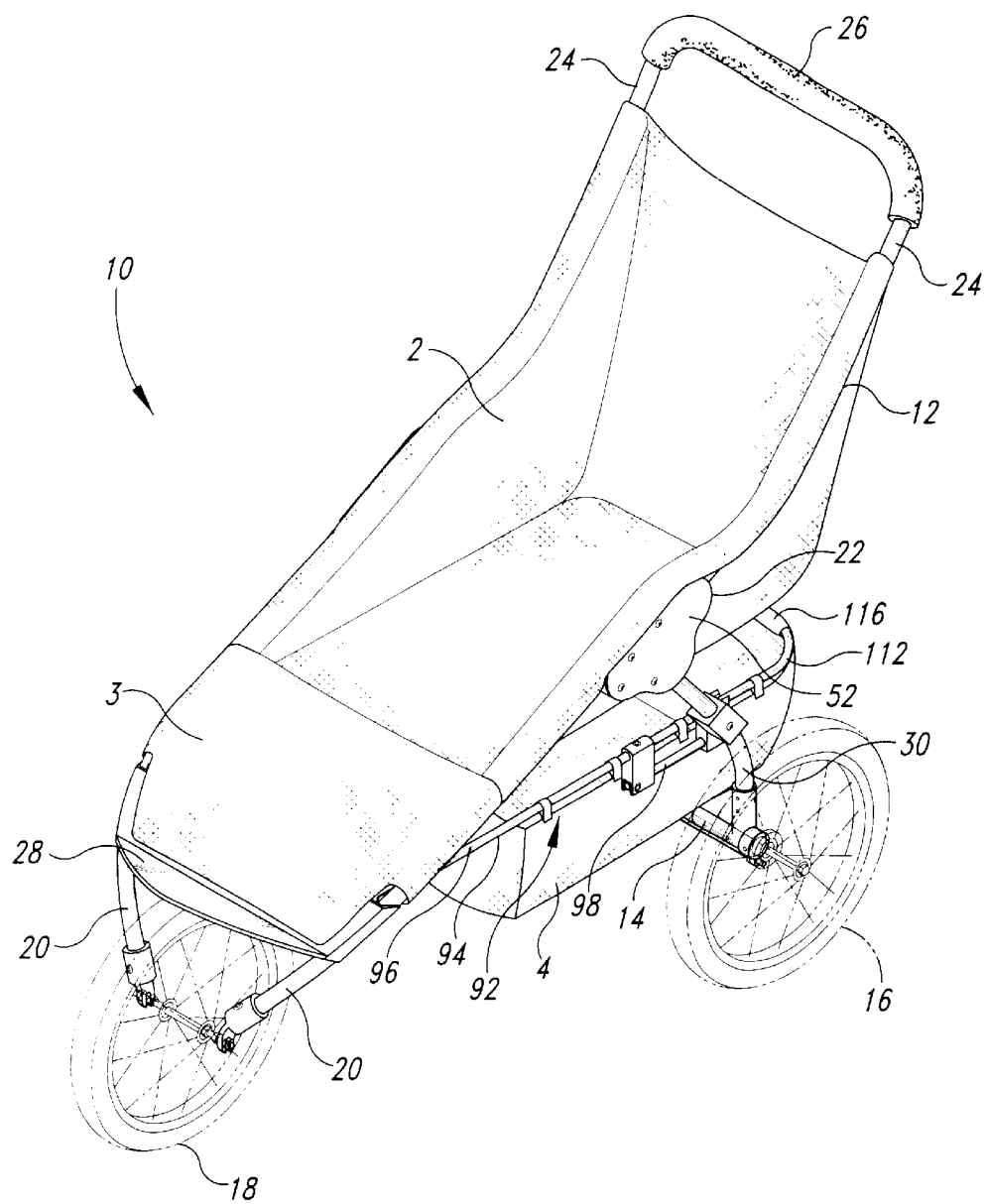
FIG. 1A is an isometric view of a baby stroller embodying the present invention shown in a fully unfolded state ready for usage.

As shown in the drawings for purposes of illustration, the present invention is embodied in an all-terrain baby stroller 10 having a foldable, tubular metal frame 12 and a transversely extending rear axle assembly 14 with a transverse, non-rotating tubular rear axle 15. Left and right side rear wheels 16 are rotatably mounted to the ends of the rear axle assembly 14. The forward end of the frame 12 has a single front wheel 18 rotatably mounted thereto.

The frame 12 includes no base frame members extending rearwardly from the front wheel 18 to the rear axle assembly 14 as do most conventional all-terrain strollers. Instead, the frame 12 includes left and right side, downwardly and forwardly sloping front wheels frame members or supports 20, which each extend downward from a corresponding one of left and right side folding assemblies 22 in a converging configuration to the front wheel 18. A forward free-end 20a of each of the left and right side front wheel supports 20 has a plastic front wheel connector 21 fixedly attached thereto with a slot 21a sized to removably receive and have attached thereto a corresponding one of the left and right ends of an axle 18a of the front wheel 18 to mount the front wheel to the stroller frame 12. The front wheel supports 20 are interconnected by a foot rest 28 that spans between them toward but rearward of their forward free-ends 20a and is fixedly attached to each at a position just above the front wheel 18 and just rearward of the axle 18a of the front wheel. As a result of the interconnection provided by the foot rest 28, and also the front wheel 18 when attached to the left and right side front wheel connectors 21, the left and right side front wheel supports 20 form a stationary unit with respect to the left and right side folding assemblies 22 upon folding and unfolding of the stroller 10, as will be described in greater detail below.

The frame 12 also includes left and right side, upwardly and rearwardly sloping handle frame members or supports 24, which each extend upward from the corresponding one of the left and right side folding assemblies 22 in a generally parallel configuration to a handle 26 extending between the left and right side handle supports. The handle 26 is covered by a foam grip. The handle supports 24 are interconnected by the handle 26 that spans between them at their rearwardmost and uppermost extension and that is fixedly attached to each. As a result of the interconnection provided by the handle 26, the left and right side handle supports 24 move as a unit with respect to the left and right side folding assemblies 22 upon folding and unfolding of the stroller 10, as will be described in greater detail below. It is noted that in lieu of the interconnecting handle 26 the handle supports 24 may each be provided with a handle portion at the upper end thereof such as used with umbrella style strollers.

In the illustrated embodiment of the invention the left and right side handles supports 24 and the handle 26 are formed as an integral unit by bending a single length of aluminum tube. Significantly, unlike most conventional all-terrain strollers, the left and right side handle supports 24 are movable relative to the left and right side front wheel supports 20 for folding of the stroller 10 and do not together form an integrated rigid upper frame.

The frame 12 also includes left and right side, downwardly and rearwardly sloping rear wheel frame members or supports 30, which each extend downward from the corresponding one of the left and right side folding assemblies 22 in a generally parallel configuration to the rear axle assembly 14. A rearward free-end 30a of each of the left and right side rear wheel supports 30 has a plastic axle connector 31 fixedly attached thereto with a transverse tubular connector portion 31a through which a corresponding one of the left and right ends of the tubular rear axle 15 extends and is fixedly attached. The rear wheel supports 30 are interconnected by the rear axle assembly 14 that spans between them at the rearward free-ends 30a thereof. As a result of the interconnection provided by the rear axle assembly 14, the left and right side rear wheel supports 30 move as a unit with respect to the left and right folding assemblies 22 for folding and unfolding of the stroller 10, as will be described in greater detail below. The left and right side rear wheel supports 30 are also movable relative to the left and right side front wheel supports 20 and the left and right side handle supports 24 for folding of the stroller 10. Further, the left and right side rear wheel supports 30 and the rear axle assembly 14 connected thereto do not form a part of a base frame extending between the rear and front wheels 16 and 18 as is the situation in most conventional all-terrain strollers. Much of the structural strength of the stroller 10 and the interconnection of the forward wheel supports 20, the handle supports 24, and the rearward wheel supports 30 are provided by the centrally positioned left and right side folding assemblies 22, and not by a base frame.

In the illustrated embodiment of the stroller 10, the left and right side front wheel supports 20, the left and right side handle supports 24, and the left and right side rear wheel supports 30 are made from aluminum tube. Suitable alternative materials may be used.

A park brake of the type described in U.S. Pat. No. 5,460,399 is mounted on the tubular rear axle 15 and forms a part of the rear axle assembly 14. The park brake has a centrally located foot-operated foot pedal 32 rotatably mounted on the tubular rear axle 15. The foot pedal 32 includes a cam 34 which slidably engages inward ends of spring-loaded left and right brake rods 36. The brake rods 36 move outward by the camming action of the cam 34 when rotated in response to the user depressing the foot pedal 32 and have outward ends which are inserted into one of several apertures in a corresponding one of left and right side hub receivers 38 affixed to the inward side of the corresponding one of the left and right side rear wheels 16.

The left and right outward ends of the tubular rear axle 15 are open and internally threaded to receive a threaded stub axle 40 forming a part of the corresponding one of the left and right rear wheels 16. A lock nut (not shown) when tightened against the face of the axle end locks the stub axle 40 against loosening during usage of the stroller 10. Alternative constructions may be used to fixedly or removably attach the rear wheels 16 to the tubular rear axle 15, and any suitable alternative manner of mounting the rear wheels 16 to the real wheel supports 30 may be used with or without a park brake.

Figure 1B:
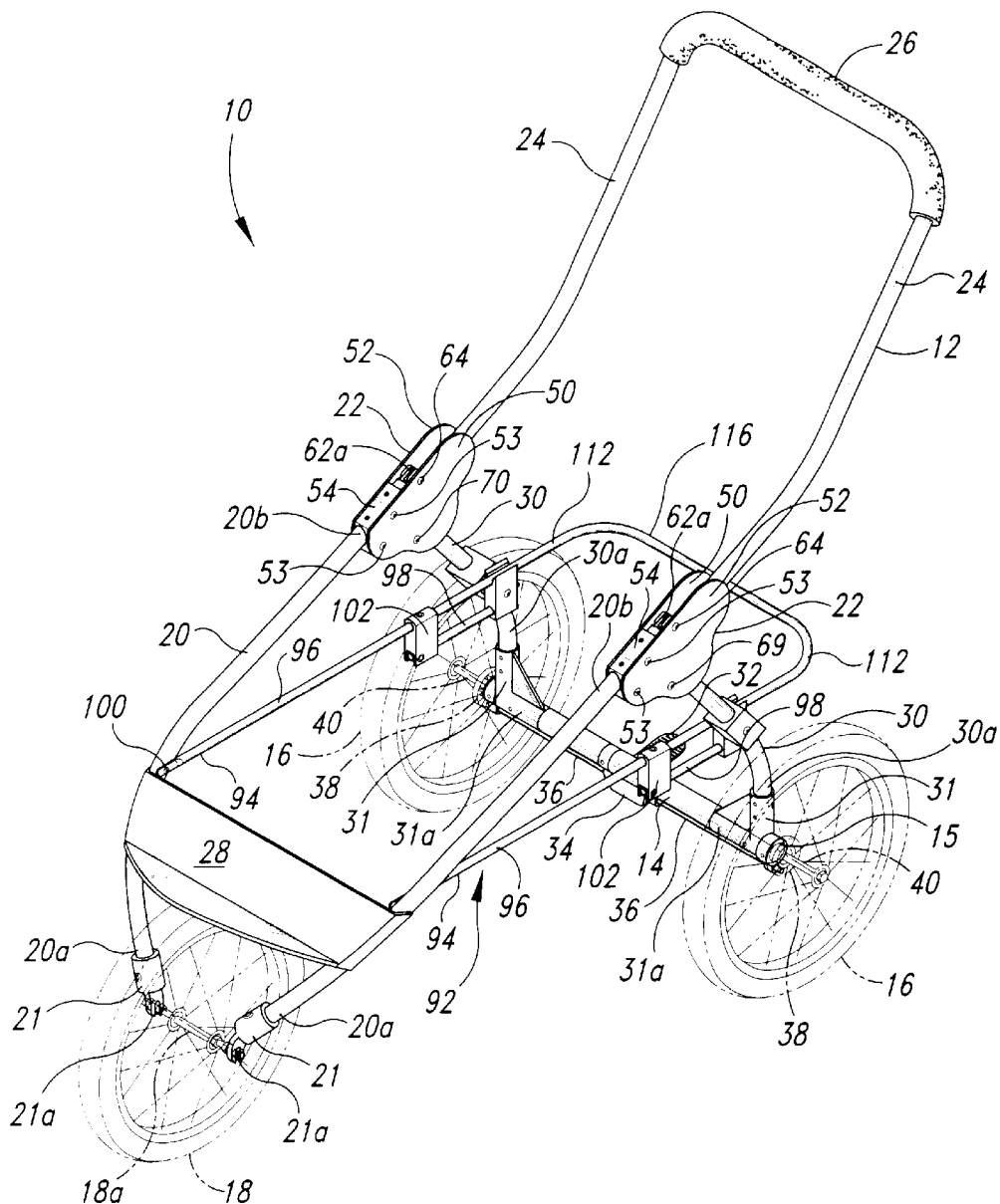
FIG. 1B is an isometric view of the stroller frame of FIG. 1A without a seat, leg guard and basket attached.

The frame 12 of the stroller 10 is shown in FIG. 1A in the fully unfolded state with a fabric seat 2, fabric leg support and guard 3 and fabric carrying pouch or basket 4 attached ready for use. For purposes of illustration, the frame 12 is shown in FIG. 1B without the seat 2, leg guard 3 and basket 4. The seat 2 is suspended from the left and right side handle supports 24, and the leg guard 3 spans between and is supported by the left and right side front wheel supports 20. The basket 4 is suspended from a latch mechanism which will be described in greater detail below.

Figures 3A, 3B, 3C:
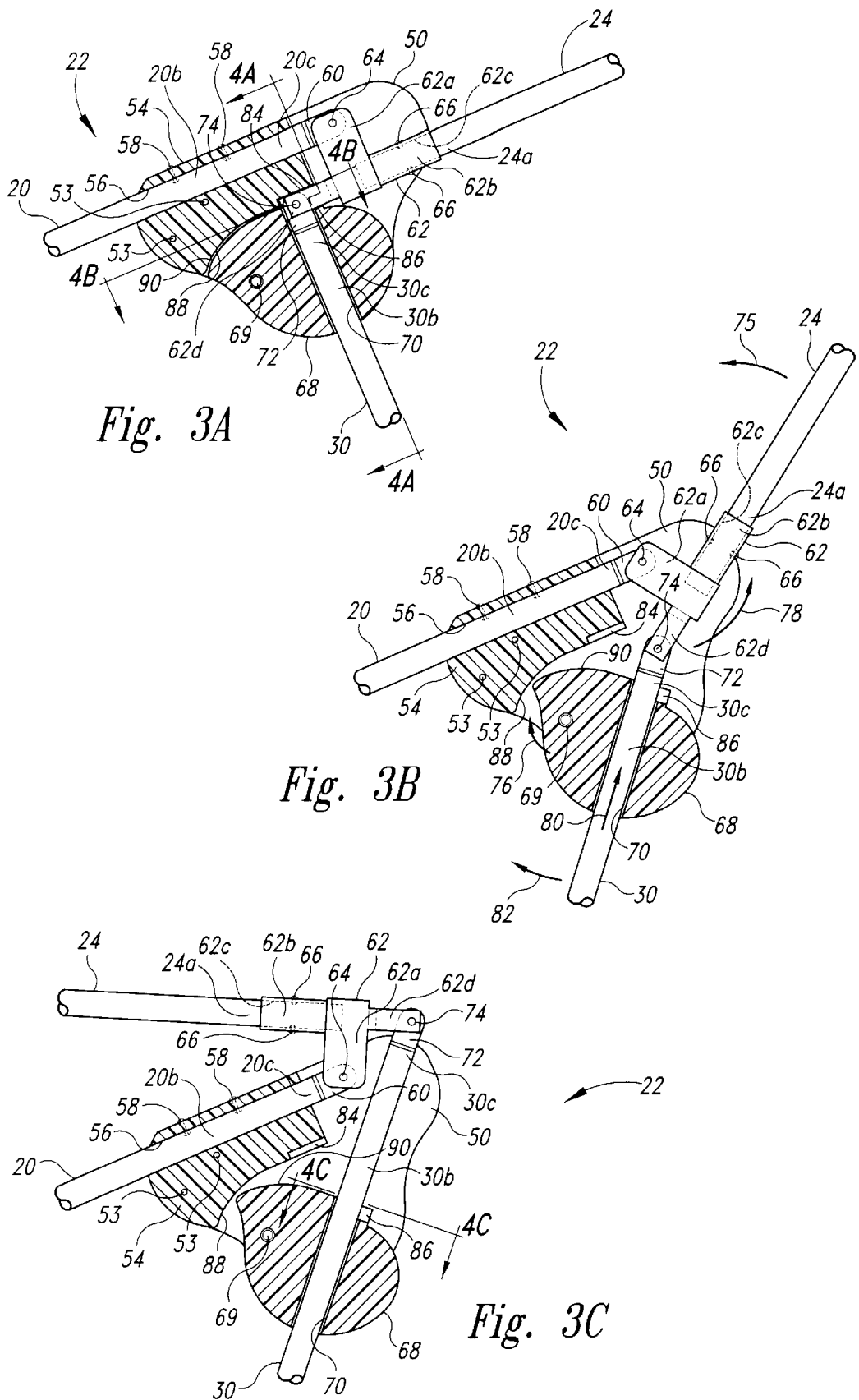
FIG. 3A is an enlarged, fragmentary, cross-sectional view of the left side folding assembly used for the front and rear wheel supports and handle portion of the stroller frame of FIG. 1B, with the stroller in the fully unfolded state shown in FIGS. 1A and 2A.
FIG. 3B shows the folding assembly of FIG. 3A with the stroller frame in the same partially folded state shown in FIG. 2C.
FIG. 3C shows the folding assembly of FIG. 3A with the stroller frame in the fully folded state shown in FIG. 2D.

The construction and operation of the left and right side folding assemblies 22 will now be described. The left and right side folding assemblies 22 have the same construction, and the description below where in the singular will be applicable to both. Each folding assembly 22 includes laterally spaced-apart inward and outward plates 50 and 52, respectively. An elongated, stationary forward member 54 is positioned between and toward a forward end of the inward and outward plates 50 and 52, and has the inward and outward plates fixedly attached thereto by a plurality of rivets 53. As best shown in FIGS. 3A–3C for the left side folding assembly 22, the forward member 54 has an elongated aperture 56 extending longitudinally fully therethrough and sized to snugly receive therein a rearward portion 20b of the corresponding one of the left and right side front wheel supports 20. As shown in FIG. 3A, the aperture 56 has an angle to match the downwardly and forwardly slope of the front wheel support therein when in the unfolded state shown in FIGS. 1A and 2A. The rearward portion 20b of the front wheel support 20 is fixedly held within the aperture 56 by a pair of rivets 58 but may be affixed with other suitable fasteners or attachment means. A rearward end portion 20c, extending rearward beyond the rearward portion 20b and rearward out of the aperture 56 of the forward member 54 has a plastic end tab 60 fixedly attached thereto. The end tab 60 is positioned between and toward a rearward end of the inward and outward plates 50 and 52.

An elongated, pivoting rearward member 62 is rotatably positioned between and toward the rearward end of the inward and outward plates 50 and 52, and has a first pair of laterally spaced-apart pivot forks 62a. The pivot forks 62a are positioned with the end tab 60 of the rearward end portion 20c of the corresponding left and right side front wheel support 20 therebetween and pivot relative thereto on a pivot pin 64. The pivot pin 64 extends between the inward and outward plates 50 and 52 of the corresponding assembly, and is affixed to each. The pivot pin 64 extends through an aperture of the end tab 60 of the corresponding left and right side front wheel support 20, and an aperture in each of the pivot forks 62a of the rearward member 62, all three of which are in coaxial alignment. The pivot pins 64 of the left and right side folding assemblies 22 are also in coaxial alignment.

The rearward member 62 has a collar 62b with an opening 62c sized to snugly receive a forward end portion 24a of the corresponding one of the left and right side handle supports 24 therein. The forward end portion 24a is fixedly held within the opening 62c by rivets 66 but may be affixed with other suitable fasteners or attachment means. As will be discussed in greater detail below, to fold the stroller 10 when in the fully unfolded state of FIGS. 1A, 2A and 3A, the handle 26 and hence the left and right side handle supports 24 are moved forward relative to the left and right side folding assemblies 22 and the left and right side front wheel supports 20 fixedly attached thereto, to cause the rearward members 62 of the left and right side folding assemblies 22 and the left and right side handle supports 24 affixed thereto to rotate in the counterclockwise direction when viewed from the left side of the stroller as shown in FIGS. 2C and 3B, about the pivot pin 64. Thus, the left and right side handle supports 24 rotate counterclockwise in unison about the rearward end portions 20c of the left and right side front wheel supports 20 during folding, and in the clockwise direction during unfolding of the stroller 10.

The pivot forks 62a project generally perpendicular to a longitudinal axis of the rearward member 62 of which it forms a part and to the forward end portion 24a of the handle support 24 fixed within the collar 62b of the rearward member. When in the fully unfolded state shown in FIGS. 1A, 2A and 3A, the pivot forks 62a project generally upward. This positions the pivot axis of the pivot pin 64 offset upward in a generally vertical plane from the handle support 24, such that when the left and right handle supports 24 are in the fully unfolded state, the handle support is nearly parallel to and rearwardly spaced apart from and below the corresponding one of the left and right side front wheel supports 20, as best seen in FIG. 3A. However, when the left and right handle supports 24 are moved into the fully folded state shown in FIGS. 2D and 3C, they are in a position forwardly spaced apart from and above the corresponding one of the left and right front wheel supports 20 but in relatively close proximity thereto. When in the fully folded state, the pivot forks 62a project generally downward. Thus, as the handle supports 24 are pivoted about the pivot pins 64, to move between the fully unfolded and folded states, the forward end portion 24a of the handle support 24 travels in an arcuate path about the pivot pin 64, with a radius determined by the length of the pivot forks 62a. In effect the pivot forks 62a serve as swing arms. The pivot forks 62a are provided with a sufficiently long length so that the end tab 60 attached to the rearward end portion 20c of the front wheel support 20 and to which the pivot forks 62a are pivotally connected by the pivot pin 64, will not interfere with and restrict the rotation of the handle support into close proximity with the corresponding front wheel support 20 when the handle support is rotated from its filly unfolded position to its fully folded position shown in FIGS. 2D and 3C. By providing sufficient length to the pivot forks 62a, upon rotation a sufficient space or clearance is provided between the handle support 24 and the corresponding front wheel support 20 so as to avoid a scissor action that could pinch the finger of the user or another that might inadvertently be placed therebetween.

The left and right side folding assemblies 22 each also include a guide 68 rotatably positioned between the inward and outward plates 50 and 52, at a position adjacent to and somewhat rearward of and below the forward member 54. The guide 68 is rotatably mounted on a pivot pin 69 extending between the inward and outward plates 50 and 52, and affixed to each. The pivot pin 69 extends through an aperture of the guide 68. As best shown in FIG. 3A—3C, each of the guides 68 has an elongated aperture 70 sized to loosely receive the corresponding one of the left and right side rear wheel supports 30 therein so that the rear wheel support is freely slidable longitudinally within the aperture 70 during folding and unfolding of the stroller 10, as will be described. A longitudinal upper portion 30b of the rear wheel supports 30 is slidably disposed in the aperture 70 of the guide 68 to slide along a longitudinal axis thereof. This results in linear movement of the upper portion 30b as well as rotational movement relative to the front wheel supports 20. An upper end portion 30c of each of the left and right side rear wheel supports 30 has a plastic end tab 72 fixedly attached thereto.

Each of the rearward members 62 attached to the forward end portions 24a of the left and right side handle supports 24, and rotatably mounted on the corresponding one of the pivot pins 64, also includes a second pair of laterally spaced-apart pivot forks 62d. The pivot forks 62d of each rearward member 62 project generally coaxial with the forward end portion 24a of the corresponding left and right side handle support 24 to which the rearward member is attached and from an end of the rearward member opposite the end with the collar 62b. The end tab 72 of the corresponding one of the left and right side rear wheel supports 30 is received between the pivot forks 62d for pivoting thereabout on a pivot pin 74 extending between the pivot forks 62d. The pivot pin 74 is affixed to each of the pivot forks 62d, and extends through an aperture of the end tab 72 received between the pivot forks 62d. The pivot pins 74 of the left and right side folding assemblies 22 are in coaxial alignment.

As a result of the pivotal connection of the upper end portions 30c of the left and right side rear wheel supports 30 to the forward end portions 24a of the corresponding left and right side handle supports 24, when the handle supports are rotated counterclockwise relative to the left and right side front wheel supports 20 for folding of the stroller 10, as described above when viewed from the left side and indicated by arrow 75 in FIGS. 2C and 3B, the handle supports rotate about the pivot pin 64 and about the rearward end portions 20c of the front wheel supports 20. This drives the guide 68 to rotate clockwise about the pivot pin 69 as indicated by arrow 76 in FIG. 3B. The movement also drives the pivot forks 62d of the handle supports 24 and the upper end portion 30c of the rear wheels supports connected thereto by the pivot pins 74 to rotate counterclockwise about the pivot pin 64 in the direction indicated by arrow 78 in FIG. 3B and hence move rearward while doing so. During this initial movement in the folding process the left and right side rear wheel supports 30 primarily rotate clockwise with the guides 68 and generally remain stationary within the apertures 70 of the guides. Also, during this initial movement, the handle supports 24 and the combination of the guides 68 and rear wheel supports 30 guided thereby rotate by about the same amount, but in opposite rotational directions.

Upon additional counterclockwise rotation of the left and right side handle supports 24 for folding of the stroller 10, the upper portions 30b of the left and right side rear wheel supports 30 begin to slide upward within the apertures 70 of the guides 68 in the direction indicated by arrow 80 in FIG. 3B. Further counterclockwise rotation of the handle supports 24 results in both clockwise rotation and linear sliding movement of the rear wheel supports 30 in the apertures 70. This compound rotational and sliding linear movement continues from just before the stroller 10 is in the position shown in FIGS. 2C and 3B until the rear axle assembly 14 attached to the rearward free-ends 30a of the rear wheel supports 30 is moved into close proximity with the front wheel supports 20. However, at this point the handle supports 24 have only rotated about 90° and project upward almost transverse to the front wheel supports 20. From this point in the folding process, as the handle supports 24 are rotated more counterclockwise, the guide 68 and the rear wheel supports 30 guided thereby experience little additional rotation. Rather, the rear wheel supports 30 primarily experience linear sliding movement in the apertures 70 of the guides 68 in the direction indicated by arrow 80 and the upper end portions 30c of the rear wheel supports 30 slide progressively further upward out of the apertures 70 until reaching the position shown in FIGS. 2D and 3C whereat the stroller 10 is in the fully folded state. During the very last portion of the counterclockwise rotation of the handle supports 24, a small amount of additional rotation of the guides 68 does occur, but it is in the counterclockwise direction and tends to move the rear wheel supports 30 and the rear axle assembly 14 to which they are attached away from the front wheel supports 20, but not by an amount large enough to significantly affect the compact configuration of the stroller 10 when it the fully folded state.

It is noted that while the rear wheel supports 30 experience a very unique sequence of movements during the folding process involving rotational and linear movement relative to the front wheel supports 20, longitudinal movement relative to its own longitudinal axis, and rotational movement relative to the handle supports 24, the handle supports 24 simply rotate counterclockwise during the entire folding process. The rear wheel supports 30 first translate linearly away from and then generally upward relative to the front wheel supports 20, with both a linear component and a rotational component, but without any points on the front and rear wheel supports being at a fixed, spaced-apart distance from the other as the movement occurs, as would result if the rear wheel supports were simply pivotally attached to the front wheel supports at fixed pivot points. The linear translation of the rear wheel supports 30 relative to the front wheel supports 20 is along a path that in portions is almost a straight line path without any rotational component, but in most portions is a curved line path with the rear wheel supports simultaneously experiencing some rotation movement relative to the front wheel supports. When viewed with respect to their own longitudinal axes, the rear wheel supports 30 move longitudinally therealong, especially after the initial primary rotational movement thereof relative to the front wheel supports 20.

As can be seen, comparing FIGS. 3A–3C, the folding process causes rotation of the guide 68 about the pivot pin 69 and compound rotational and sliding linear movement of the rear wheel supports 30 such that the free-end 30a of the rear wheel supports and the rear axle assembly 14 connected thereto move in the direction shown by arrow 82 in FIGS. 2C and 3B toward the underside of the front wheel supports 20. The folding process ends when they reach a tucked position below and adjacent to the front wheel supports 20 shown in FIGS. 2D and 3C with the stroller 10 in the fully folded state. The counterclockwise rotation of the left and right side handle supports 24 in the direction of arrow 75 during the folding process also results in their movement to an overlaying position above and adjacent to the front wheel supports, as best shown in FIGS. 2D and 3C. When fully folded, the handle supports 24 and the rear wheel supports 30 are essentially in a clamshell position about the front wheel supports 20. When being folded or unfolded, the handle supports 24 rotate about 180° relative to the front wheel supports 20 and the rear wheel supports 30 rotate about 90° relative to the front wheel supports.

As best seen in FIG. 2D, the result of the folding process is that the stroller 10 folds into a very compact configuration or envelope with a very small folded size to facilitate its transportation and storage. The folded size is sufficiently small that a full size all-terrain stroller can be folded so as to easily fit in the trunk of even a small car without removal of the front or rear wheels. The small folded size also facilitates shipment in a fully assembled but folded state, and eliminates the need to remove or reattached the wheels to the stroller. Further, the folding is accomplished without tools on the need to disconnect the front wheel supports 20, handle supports 24 or rear wheel supports 30 from each other. It is noted that the placement of the foot rest 28 along the front wheel supports 20 and the length of the handle supports 24 are selected such that when in the fully folded state the handle 26 nests within the foot rest to minimize interference and reduce the folded size.

The unfolding of the stroller 10 from the fully folded state shown in FIGS. 2D and 3C is accomplished by rotating the left and right handle supports 24 clockwise relative to the left and right side front wheel supports 20 (as viewed from the left side) in the direction opposite that indicated by the arrow 75. The sequence of movements described above for the folding process simply occurs in reverse and the handle supports 24 and the rear wheel supports 30 are returned to their fully unfolded positions shown in FIGS. 1A, 2A and 3A.

As best understood by reference to FIG. 2D, when the stroller 10 is folded, the sitting side of the seat 2 suspended from the left and right side handle supports 24 and the leg contact side of the leg guard 3 supported by the left and right side front wheel supports 20 will be moved into face-to-face relation. As such, the surfaces contacted by a child sitting in the stroller 10 are generally enclosed and protected from contact with dirty items during transportation and storage in the fully folded state, such as the less than sterile items sometimes found in a car trunk.

It is noted, however, that while the illustrated embodiment of the stroller 10 is constructed so that the handle supports 24 and the rear wheel support members 30 fold about the front wheel supports 20 to sandwich the front wheel supports therebetween, alternative constructions are possible, although less desirable. For example, the left and right folding assemblies 22 may be constructed so that the rear wheel supports 30 are the "stationary" supports about which the handle supports 24 and the front wheel supports 20 fold to sandwich the rear wheel supports therebetween. Alternatively, the folding assemblies 22 may be constructed so that the handle supports 24 are the "stationary" supports about which the front wheel supports 20 and the rear wheel supports 30 fold to sandwich the handle supports therebetween. Of course, while referred to as stationary supports, those members are only stationary in a relative sense in that the other two type of supports move relative thereto with the stationary supports being sandwiched therebetween.

Figure 4A:
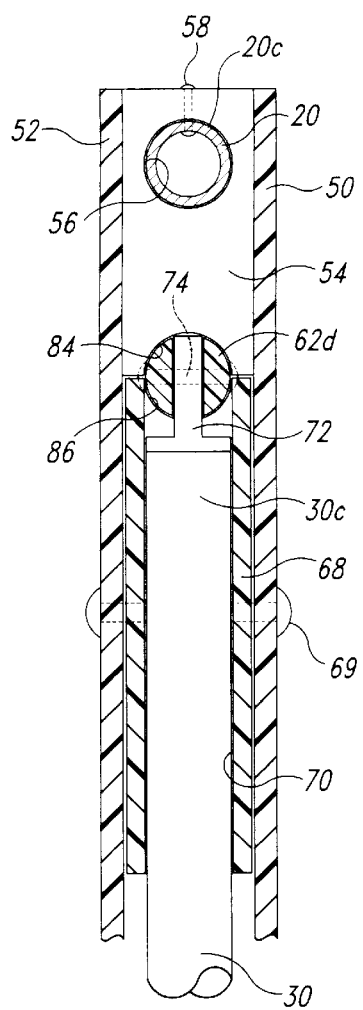
FIG. 4A is an enlarged, fragmentary, sectional view taken substantially along the line 4A—4A of FIG. 3A.
Figure 4B:
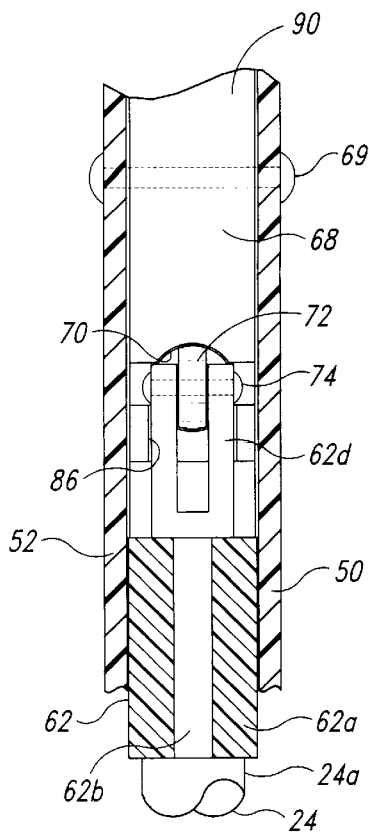
FIG. 4B is an enlarged, fragmentary, sectional view taken substantially along the line 4B—4B of FIG. 3A.
Figure 4C:
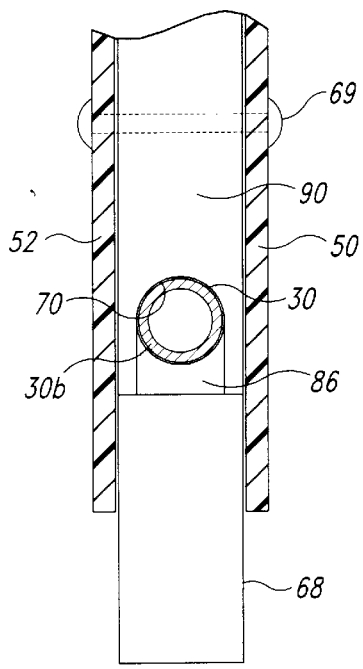
FIG. 4C is an enlarged, fragmentary, sectional view taken substantially along the line 4C—4C of FIG. 3C.

To increase the rigidity of the stroller 10 when fully unfolded and in use, the forward member 54 and the guide 68 of each of the left and right side folding assemblies 22 have recesses 84 and 86, respectively. When the stroller 10 is in the fully unfolded state, the recesses 84 and 86 of each folding assembly 22 are in opposing positions facing each other to together form a chamber to receive and securely clamp the pivot forks 62d of the rearward member 62 therein, as best illustrated in FIGS. 4A and 4B. Any downward force applied to the handle 26 by the user when the stroller 10 is in the fully unfolded state of FIG. 3A tends to drive the guides 68 to rotate counterclockwise and drive the rearward members 62 to rotate clockwise (as viewed from the left side), thereby pressing the pivot forks 62d firmly into the recesses 84 in the forward members 54 and clamping them within the chamber defined with the recesses 86 as a result of the upward force applied by the guide 68. This further adds to the rigidity and strength of the stroller 10. This also helps to eliminate torqueing of the stroller frame 12 when the user applies an unevenly distributed force to the handle 26 during usage, and has to eliminate lateral wobble movement of the stroller frame during usage. As a result, the stroller 10 has a rigid and sturdy feel, and annoying frame distortions during usage are reduced.

The strength and rigidity of the stroller 10 is enhanced against downward forces applied by the user to the handle 26, such as when pressing downward on the handle to lift the front wheel 18 to transition over a curb, by selecting a suitable length for the portion of the rearward member 62 (which includes the pivot forks 62d) projecting forward beyond the pivot pin 64 when in the fully unfolded state. As best seen in FIG. 3A, the length of the forward projecting portion of the rearward member 62 and the length of the recess 84 which receives the pivot forks 62d, are selected to provide a suitably large counterforce to the downward forces applied to the handle to limit clockwise rotation of the handle supports 24 which might otherwise result, especially if the pivot connection at the pivot pin 64 or the components making the connection are not manufactured with great accuracy and with very rigid material. The forward portion of the rearward member 62 that extends forward beyond the pivot pin 64 serves as a lever arm to counter the downward forces applied to the handle 26 and the clockwise rotation they tend to generate. A length of two inches has proven adequate.

To provide additional increased rigidity for the stroller 10 when fully unfolded and in use, the forward member 54 has a downwardly facing curved stop surface 88 and the guide 68 has a correspondingly shaped, upwardly facing curved stop engagement surface 90 which rotates into engagement with the stop surfaces 88 of the forward member when the stroller is in the fully folded state to limit rotation of the guide 68 in the counterclockwise direction opposite that indicated by arrow 76 beyond that achieved by the guide when the stroller is in the fully unfolded state. This helps eliminate downward movement of the handle supports 24 and the handle 26 relative to the front and rear wheel supports 20 and 30 when a downward force is applied to the handle by the user to lift the front wheel 18 during usage, and gives the stroller 10 a rigid feel and quick responsiveness.

As described above, the pivot forks 62a of the rearward member 62 connected to the left and right side handle supports 24 are rotatably mounted on the pivot pins 64 for rotation relative to the left and right side front wheel supports 20, and the pivot pins 64 each pass through an aperture of the end tab 60 of the corresponding one of the front wheel supports. It is noted that while the handle supports 24 must be rotatable relative to the front wheel supports 20, the end tabs 60 of the front wheel support need not receive the pivot pins 64. This is because the inward and outward plates 50 and 52 of the left and right side folding assemblies 22 adequately support the pivot pins 64 and permit the desired rotation of the handle supports 24 relative to the front wheel supports 20. However, by interconnecting the end tabs 60 of the front wheel supports 20 with the rearward members 62 attached to the handle supports 24, a stronger and more rigid stroller construction is achieved since forces encountered during use of the stroller 10 that must be transmitted between the handle supports 24 and the first wheel supports 20 at least in part can be transmitted more directly therebetween through the pivot pins 64. The force need not pass entirely via the inward and outward plates 50 and 52. It is noted that some of these forces are also transmitted by the clamping of the pivot forks 62d of the rearward member 62 in the chambers formed by the opposing recesses 84 and 86 of the forward members 54 and guides 68.

In alternative embodiments not illustrated, one or both of the inward and outward plates 50 and 52 of the left and right folding assemblies 22 can be eliminated or at least not used to facilitate rotation of the handle supports 24 relative to the front wheel supports 20. This is done by pivotally mounting the left and right handle supports 24 to a single plate on each side or directly to the corresponding one of the left and right front wheel supports 20. Similarly, the guide 68 can be pivotally mounted to the single plate on each side or directly to the corresponding one of the left and right side front wheel supports 20.

Figure 1C:
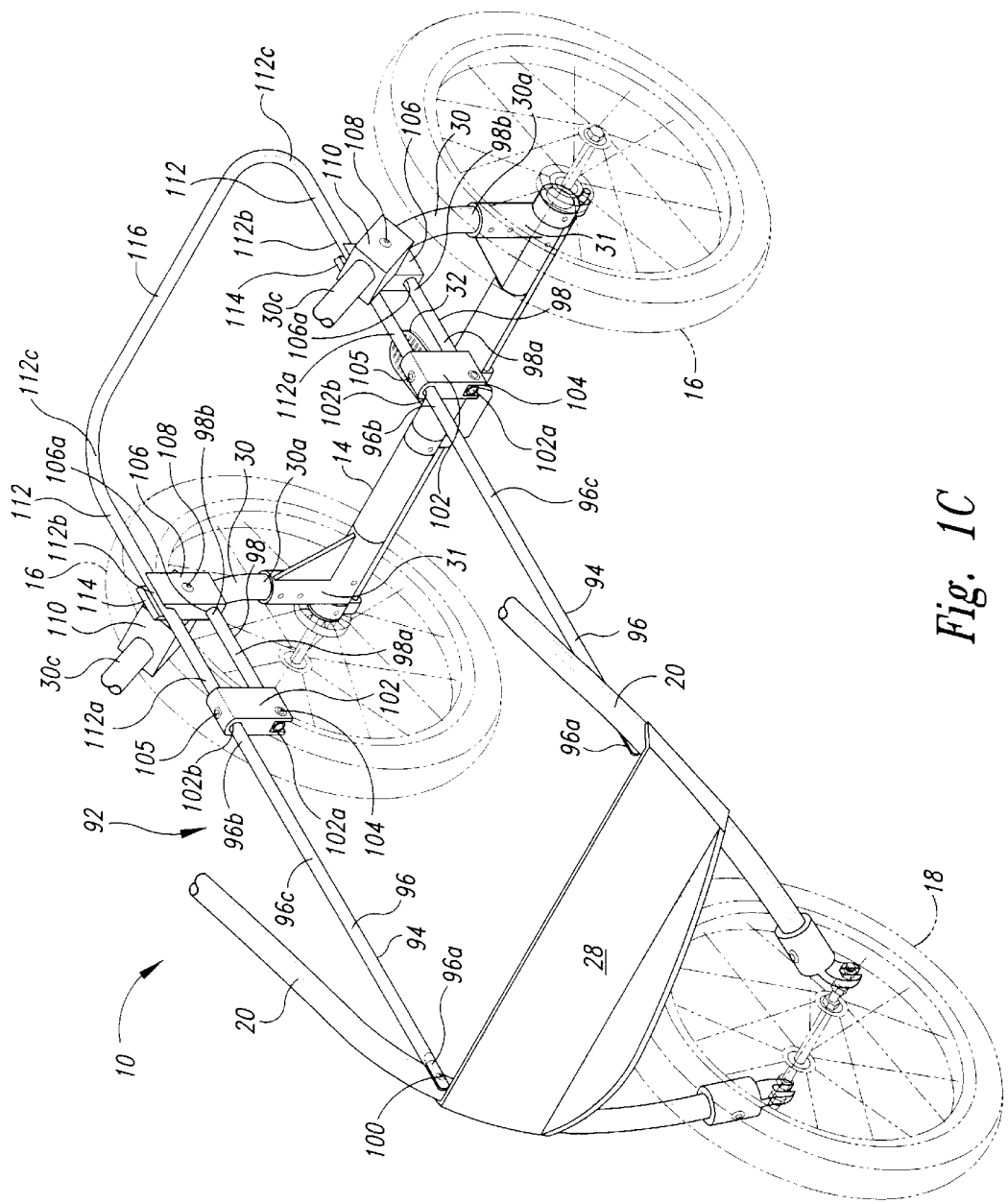
FIG. 1C is an enlarged, fragmentary, isometric view of the stroller frame of FIG. 1B better illustrating a latch mechanism used

To securely maintain the frame 12 of the stroller 10 in the fully unfolded state shown in FIGS. 1A, 2A and 3A, the stroller includes a latch mechanism 92. The latch mechanism 92 is best shown in FIG. 1C and has left and right side latches 94. Each latch 94 has a forward latch arm 96 and a rearward latch arm 98. The forward latch arm 96 of each of the left and right side latches 94 has a forward end 96a pivotally connected to the corresponding one of the left and right side front wheel supports 20 by a pivot pin 100 at a location toward the attachment location of the foot rest 28. Each forward latch arm 96 also includes a rearward end 96b and a mid-portion 96c extending between the forward and rearward ends 96a and 96b. The rearward latch arm 98 of each of the left and right side latches 94 has a forward end 98a attached to a corresponding one of left and right connector blocks 102. The forward end 98a is received between a pair of laterally spaced-apart pivot forks 102a of the connector block 102 for pivoting thereabout on a pivot pin 104 extending between and affixed to each of the pivot forks. Each of the left and right side connector blocks 102 has an aperture 102b through which the rearward end portion 96b of the forward latch arm 96 of the corresponding one of the left and right side latches 94 extend. The connector block 102 is fixedly attached to the rearward end portion 96b extending therethrough by a rivet 105.

The rearward latch arms 98 each have a rearward end 98b received in an aperture 106a of a corresponding one of left and right side pivot blocks 106. The pivot block 106 is fixedly attached to the rearward end 98b by a rivet (not shown). The left and right side pivot blocks 106 are each pivotally attached by a pivot pin 108 to a corresponding one of left and right mounting blocks 110 fixedly attached to the corresponding one of the left and right side rear wheel supports 30 along a mid-portion 30c thereof. The lengths of the forward and rearward latch arms 96 and 98 of each of the left and right side latches 94 are sized such that when held in a locked position as shown in FIG. 1C, they rigidly hold the left side front and rear wheel supports 20 and 30 apart with a fixed, fully unfolded spacing, and likewise rigidly hold the right side front and rear wheel supports 20 and 30 apart with the same fixed, fully unfolded spacing to eliminate movement between the front and rear wheel supports during usage of the stroller 10 and prevent torqueing of the frame 12. When in the locked position, the forward and rearward latch arms 96 and 98 extend generally horizontally and parallel, with the forward latch arm spaced above the rearward latch arm.

The forward and rearward latch arms 96 and 98 of the left and right side latches 94 are securely held in the locked position by left and right side lock arms 112 which are arranged as rearward extensions of the corresponding one of the forward latch arms 96. A forward end 112a of the lock arm 112 is fixedly attached to the rearward end 96b of the corresponding forward latch arm 96. In the illustrated embodiment, the forward latch arm 96 and the corresponding lock arm 112 extending therefrom are formed from a single length of steel rod or other suitable materials, but they may be manufactured as separate components attached together.

Each of the left and right side lock arms 112, when the corresponding forward and rearward latch arms 96 and 98 are moved into the locked position, has a mid-portion 112b that is snap fit into a locking recess 114 formed between a pair of upward projecting resilient wall members of the corresponding one of the left and right side pivot blocks 106. The lock arms 112 are held in the locking recesses 114 with sufficient force that they will not unintentionally free themselves during use of the stroller 10, but may be intentionally moved upward and out of the locking recesses to an unlocked position by a relatively small upward force applied by the user in the direction indicated by arrow 115 in FIG. 2B as an initial step in folding of the stroller in the manner described above. The lock arms 112 are shown raised into the unlocked position in FIG. 2B. When in this position, the counterclockwise rotation of the left and right handle supports 24 that results in the clockwise rotation of the left and right rear wheel supports 30 described above for folding of the stroller 10, will not be impeded by the left and right side latches 94 since they are no longer held in the locked position by the lock arms 112. As such, the forward and rearward latch arms 96 and 98 are free to pivot relative to each other and the front and rear wheel supports 20 and 30 in response to forces applied thereto during the folding process.

It is noted that alternative designs may be used to lock the handle supports 24 and the rear wheel supports 30 in place relative to the front wheel supports 20 when in the fully unfolded state for usage of the stroller.

To facilitate the user applying the necessary upward force on the lock arms 112 to release them from the locking recesses 114, a release member 116 extends transversely between and is fixedly attached to a rearward end 112c of each of the lock arms 112. In the illustrated embodiment, the lock arms 112 and the release member 116 are formed from a single length of bent steel rod, but they may be manufactured from separate components attached together. The release member 116 is positioned to be easily and quickly engaged by the top side of the user's foot or by one of the user's hands to apply the relatively small upward force thereto needed for releasing the lock arms 112.

The release member 116 also serves as a convenient handle both for folding the stroller 10 and for carrying the folded stroller. As described above, the stroller 10 is folded by rotating the left and right handle supports 24 counterclockwise (as viewed from the left side). This can be quickly and easily accomplished by the user with little effort by either pushing the handle 26 forward while placing the front wheel 18 against a stationary object or holding the release member 116 against forward movement with the foot or hand (of course, after the lock arms 112 have first been moved to the unlocked position of FIG. 2B). Another perhaps even quicker and easier way to accomplish the folding is for the user to grasp the release member 116 in one hand and simply pick up the stroller 10 by the release member (after the lock arms 112 have first been moved to the unlocked position). The weight of the handle supports 24, the handle 26, the left and right side rear wheel supports 30, the axle assembly 14 and rear wheels 16 attached thereto tend to cause the handle supports to rotate counterclockwise and the rear wheel supports to rotate clockwise relative to the front wheel supports 20, thereby folding them about the front wheel support as described above with respect to operation of the folding assemblies 22. To the extent the weight does not fully fold the stroller, the folding movement can usually be completed by the user providing the stroller with a quick upward movement via the grasped release member 16. Alternatively, the user may apply a slightly inward force on one of the handle supports on the handle in the folding direction by hand or by pushing against the user's leg or some stationary object.

Unfolding of the folded stroller 10 is even easier and quicker than the folding process. The user can simply grasp the handle 26 of the folded stroller in one hand and move the stroller quickly upward. The resulting rotational momentum of the rear wheels 16 attached to the rear axle assembly 14 that results will apply sufficient rearward force in the direction opposite to the arrow 82 shown in FIG. 2C that the frame 12 will pop open to the almost fully unfolded state of FIG. 2B. The user then need only rest the rear and front wheels 16 and 18 of the stroller on the ground and press downward with the foot or hand on the release member 116. This will drive the left and right side latches 94 into the locked position and move the left and right side lock arms 112 into the corresponding locking recesses 114. The stroller 10 is then ready for use.

As described above, the stroller 10 can be folded and unfolded easily and quickly, using a single hand if desired thus leaving the other hand free to perform other tasks. The folding and unfolding can be accomplished by persons with little physical strength or mechanical skills. Further, no tools are required. The conventional quick release pins commonly used with all-terrain strollers, and sometimes so difficult to insert and remove, have been eliminated.

The left and right side handle supports 24 and the left and right side rear wheel supports 30 have aesthetically pleasing, smoothly curving shapes. While the smooth curving shapes were chosen primarily for aesthetic reasons, use of a bent shape also serves to position the handle 26 and the rear axle assemble 14 with the rear wheels 16 attached thereto closer to the front wheel supports 20 when the stroller 10 is moved into the fully folded state, as best shown in FIG. 2D. This produces a more compact configuration and smaller folded stroller size than otherwise possible, The left and right side latches 94, the left and right side lock arms 112, and the release member 116 also serve the function of supporting the basket 4 beneath the seat 2 of the stroller 10 so that desired articles can be carried along when using the stroller. The weight of the article in the basket 4 also tends to help prevent accidental movement of the release member 116 and the resulting unlocking of the latches 94. It is noted that when the stroller 10 is moved into the fully folded state of FIG. 2D, the open top of the basket 4 is moved into close proximity with the under side of the leg guard 3 which tends to serve as a closure for the basket to reduce the chance of articles falling out of the basket. As such, the user can simply grasp the stroller by the release member 116 for folding and after folded carry the folded stroller much like a suitcase with articles in the basket 4 securely held therein.

Figure 5:
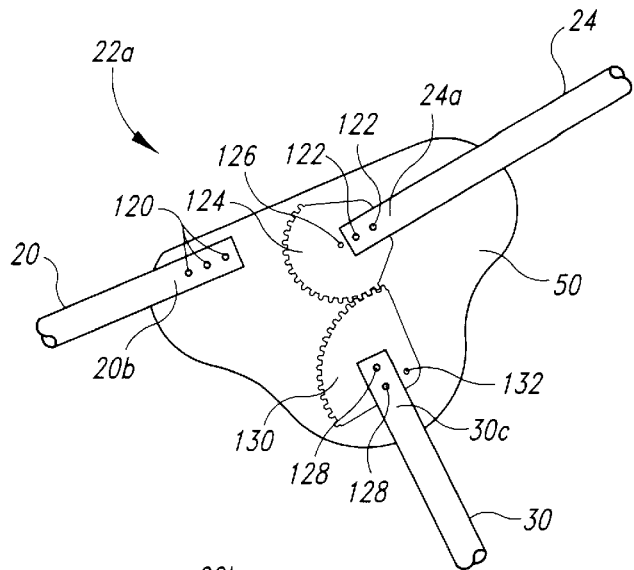
FIG. 5 is a schematic view of a first alternative embodiment of the folding assembly of the present invention.

A first alternative embodiment of the folding assembly 22a is shown in FIG. 5. In this embodiment the forward wheel support 20 has its rearward portion 20b fixedly attached between the inward and outward plates 50 and 52 by a plurality of rivets 120. The forward end portion 24a of the handle support member 24 is fixedly attached by a plurality of rivets 122 to a gear segment 124. The gear segment is pivotally attached to and between the inward and outward plates 50 and 52 for rotation relative thereto by a pivot pin 126.

The rear wheel support 30 has its upper end portion 30c fixedly attached by a plurality of rivets 128 to a gear segment 130. The gear segment is pivotally attached to and between the inward and outward plates 50 and 52 for rotation relative thereto by a pivot pin 132. The gear segments 124 and 130 mesh such that counterclockwise rotation of the handle support 24 causes clockwise rotation of the rear wheel support 30 for folding of the stroller, much as described above with respect to the first illustrated embodiment of the folding assembly 22. The gear segments 124 and 130 have their respective diameters selected with a size such that rotation of the handle support 24 by about 180° in a counterclockwise direction will result in clockwise rotation of the rear wheel support 30 by about 90°, again much as discussed above with respect to the first illustrated embodiment of the folding assembly 22, to produce a folding motion of the handle supports 24 and the rear wheel supports 30 about the forward wheel supports 20. The unfolding motion is in the opposite direction. Generally the same benefits discussed above with respect to the first described embodiment are obtained.

Figure 6:
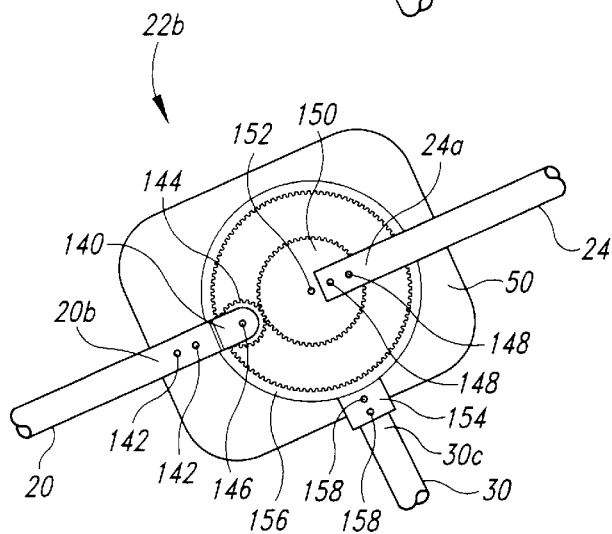
FIG. 6 is a schematic view of a second alternative embodiment of the folding assembly of the present invention.

A second alternative embodiment of the folding assembly 22b is shown in FIG. 6. In this embodiment the rearward portion 20b of the front wheel support 20 has a gear support member 140 fixedly attached thereto by a plurality of rivets 142. An idler planetary gear 144 of a planetary gear arrangement is mounted to the gear support member 140 and between the inward and outward plates 50 and 52 for rotation relative to the front wheel support 20 and the plates by a pivot pin 146. The forward end portion 24a of the handle support 24 is fixedly attached by a plurality of rivets 148 to a sun gear 150. The sun gear 150 is mounted between the inward and outward plates 50 and 52 for rotation relative thereto by a pivot pin 152. The upper end portion 30c of the rear wheel support 30 is fixedly attached by a connector 154 to an outer ring gear 156 by a plurality of rivets 158. The ring gear 156 is mounted between the inward and outward plates 50 and 52 for rotation relative thereto by a support (not shown). The idler gear 144 is positioned between the sun gear 150 and the ring gear 156 and sized to engage and mesh with both.

The operation of the second alternative embodiment of the folding assembly 22b is much like described above for the embodiments where rotation of the handle support 24 produces rotation of the rear wheel support 30. In particular, counterclockwise rotation of the handle support 24 for the folding assembly 22b results in counterclockwise rotation of the sun gear 150 about the pivot pin 152. The counterclockwise rotation of the sun gear 150, through its engagement with the idler gear 144, produces clockwise rotation of the idler gear about the pivot pin 146. This clockwise rotation is transmitted to the ring gear 156 through its engagement with the idler gear 144, and both the ring gear and the rear wheel support 30 attached thereto rotate clockwise. By the appropriate selection of the sizes and gearing for the sun gear 150, ring gear 156, and idler gear 144, the counterclockwise rotation of the handle support 24 by about 180° produces about 90° of clockwise rotation of the rear wheel support 30 so that the handle support and the rear wheel support fold about the front wheel support 20 as described above for other embodiments of the folding assembly.

Figure 7:
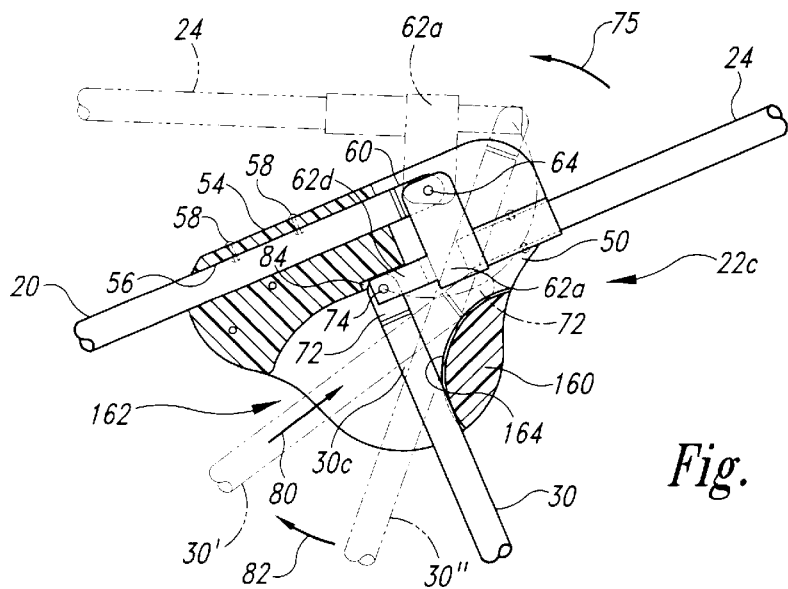
FIG. 7 is a cross-sectional view of the left side folding assembly for a third alternative embodiment of the folding assembly of the present invention, showing the stroller frame in the fully unfolded state in solid line and in the partially folded and fully folded states in broken line.

A third alternative embodiment of the folding assembly 22c is shown in FIG. 7. This embodiment uses the same forward member 54 which is fixedly positioned between the inward and outward plates 50 and 52, and has the aperture 56 which receives the rearward portion 20b of the corresponding one of the left and right side front wheel supports 20 as described above for the embodiment of FIG. 1 (best shown in FIGS. 3A–3C). Similarly, this embodiment uses the same rearward member 62 to which the forward end portion 24a of the corresponding one of the left and right side handle supports 24 is attached and which has the pivot forks 62a pivotally attached to the corresponding one of the left and right side front wheel supports 20 as described above for the embodiment of FIG. 1. Also, the same pivot forks 62d of each rearward member 62 are pivotally attached to the end tab 72 of the upper end portion 30c of the corresponding one of the left and right side rear wheel supports 30. However, in this third alternative embodiment, the folding assembly 22c does not use the pivoted guide 68 of the embodiment of FIG. 1. Instead, a stationary guide 160 is fixedly positioned between the inward and outward plates 50 and 52 of each of the left and right side folding assemblies 22c at a position spaced-apart from the forward member 54 to define a passageway 162 therebetween. The guide 160 has a curved engagement surface 164 which faces generally forward and into the passageway 162. The engagement surface 164 has a groove running along the length of the engagement surface with a contour sized to receive a portion of the tubular upper end portion 30c of the rear wheel support 30 therein.

The pivot forks 62d of the rearward member 62 attached to the handle support 24 and the end tab 72 attached to upper end portion 30c of the rear wheel support 30 are positioned and pivotally connected together in the passageway 162 when the stroller 10 using the folding assemblies 22c is in the fully unfolded state shown in solid line in FIG. 7. In this state, the weight of the stroller 10 tends to drive the rear wheel support 30 rearward and a portion of the upper end portion 30c into firm seated engagement with a lower portion of the engagement surface 164 of the guide 160. As in FIG. 1, when in the fully unfolded state, the pivot fork 62d is firmly seated in the recess 84 of the forward member 54.

Since the upper end portion 30c of the rear wheel support 30 is trapped in the passageway 162, between the forward member 54 and the guide 160, and laterally between the inward and outward plates 50 and 52 of the folding assembly 22c, as the left and right side handle supports 24 are rotated counterclockwise relative to the left and right side front wheel supports 20 for folding of the stroller 10, as indicated by the arrow 75 in FIG. 7, the upper end portion 30c of the rear wheel support 30 is retained in the passageway and guided to move much like as described above for the embodiment of FIG. 1 using the pivoted guide 68, although not with as much precision of movement. In particular, initial counterclockwise rotation of the handle support 24 primarily produces a clockwise rotation of the end tab 72 and the uppermost upper end portion 30c of the rear wheel support 30. If the folding occurs with the weight of the stroller 10 at least partially supported by the rear wheels 16 of the stroller, the clockwise rotation of the upper end portion 30c causes the guide 160 to serve as a fulcrum and the portion of the upper end portion 30c and the rest of the rear wheel support 30 below the point of engagement of the upper end portion 30c with the guide 160 to rotate counterclockwise and forward as shown by the arrow 82 in FIG. 7. This moves the rear wheels 16 toward the bottom side of the front wheel supports 20.

As the counterclockwise rotation of the handle support 24 continues for folding of the stroller 10, the upper end portion 30c tends to slide upward along the lengthwise extending groove in the engagement surface 164 of the guide 160, guided and retained thereby, much as results using the pivoting guide 68 of the embodiment of FIG. 1. It is noted that without some of the weight of the stroller applied to the rear wheels 16, the rear wheel support 30 is free to pivot somewhat forward on the pivot pin 74 which pivotally connects it to the handle support 24, unless a rearward braking force is applied thereto by other means, such as the latch mechanism 92 or a spring (not shown). For clarity, in FIG. 7 only the rear wheel support of the folding assembly 22c is shown in a partially folded state in broken line and is identified by the reference numeral 30'.

While the initial movement of the rear wheel support 30 is primarily rotational, the additional counterclockwise rotation of the handle support 24 for folding of the stroller 10 causes linear movement of the rear wheel support 30 relative to the front wheel support 20 and longitudinal movement of the rear wheel support 30 along its own longitudinal axis until moved into the fully folded state illustrated in FIG. 7 in broken line (it is noted that for clarity the rear wheel support when in the fully folded state is identified by reference numeral 30"). The end position achieved for the front and rear wheel supports 20 and 30, and the handle supports 24 is the same as achieved for the embodiment of FIG. 1. Of course, changes in the construction, such as the positioning and shape of the engagement surface 164 of the guide 160, can be used to alter the guided movement and fully folded end position of the rear wheel supports 30, as desired.

While the folding assembly 22c of FIG. 7 produces generally the same movement and positions of the front and rear wheel supports 20 and 30, and the handle supports 24, as does the embodiment of FIG. 1, it does so without requiring use of the pivoted guide 68 having the aperture 70 therein through which the rear wheel support 30 must slide. This reduces the cost of manufacture and also eliminates the possibility of the rear wheel support 30 binding within the aperture 70, especially since the rear wheel support has a curved shape. The use of the guide 160 and the relatively large passageway 162 through which the rear wheel support passes and by which it is guided as the stroller 10 is folded and unfolded allows the rear wheel support 30 to be designed with even greater curvature than used with the embodiment of FIG. 1 or even with a non-regular shape without causing it to bind in the aperture 70 as might happen with the pivoted guide 68 unless the aperture 70 was substantially enlarged.

Figure 8A:
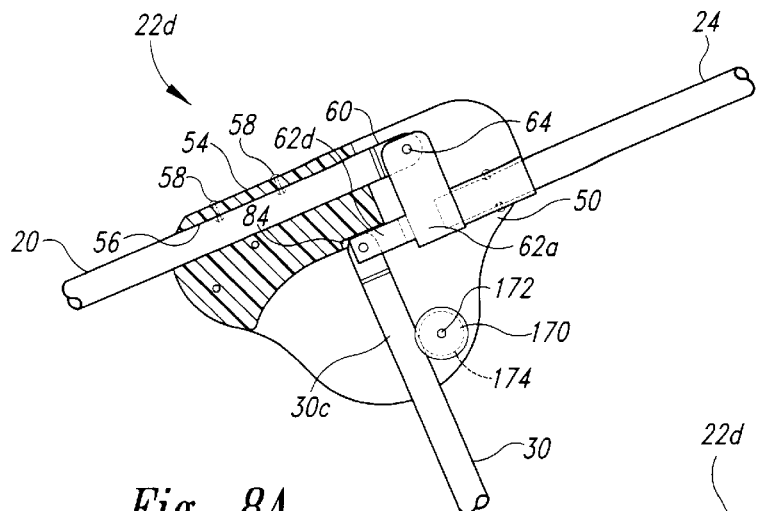
FIG. 8A is a cross-sectional view of the left side folding assembly for a fourth alternative embodiment of the folding assembly of the present invention, showing the stroller frame in the fully unfolded state.
Figure 8B:
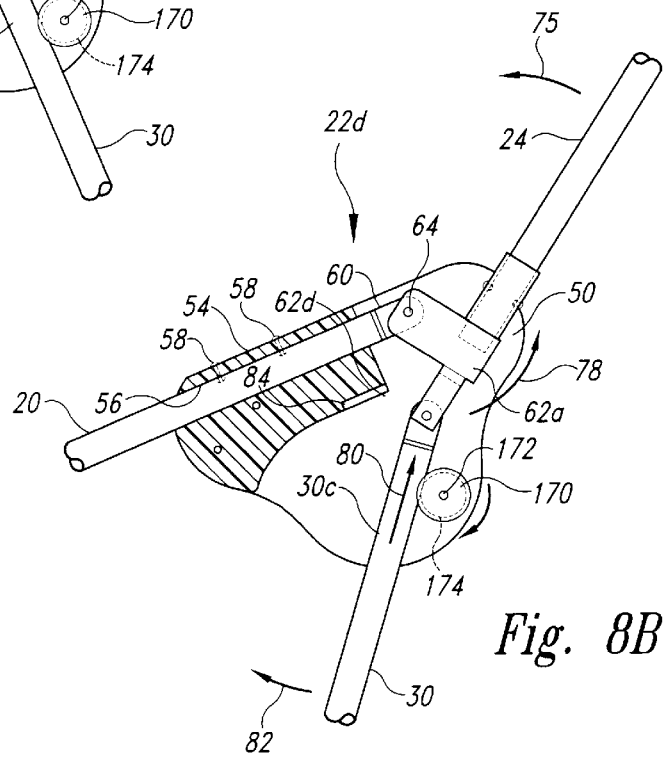
FIG. 8B shows the folding assembly of FIG. 8A with the stroller frame in the partially folded state.
Figure 8C:
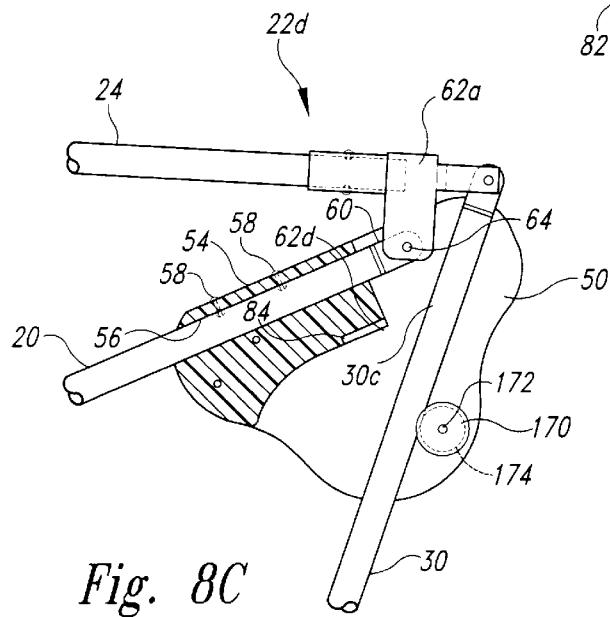
FIG. 8C shows the folding assembly of FIG. 8A with the stroller frame in the fully folded state.
Figure 8D:
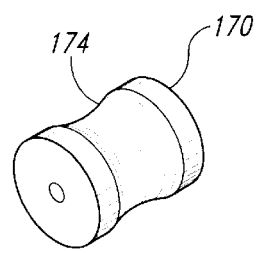
FIG. 8D shows an enlarged isometric view of a roller guide used in the fourth alternative embodiments shown in FIGS. 8A–8C.

A fourth alternative embodiment of the folding assembly 22d is shown in FIGS. 8A, 8B and 8C. This embodiment is very similar to the embodiment of FIG. 7 described above except that the stationary guide 160 is replaced with a roller 170 pivotally mounted on an axle 172 between the inward and outward plates 50 and 52. As shown in FIG. 8D, the roller 170 has a groove 174 extending circumferentially fully about the roller. The groove has a contour sized to receive a portion of the tubular upper end portion 30c of the rear wheel support 30 therein when engaged by the roller, as with the groove which runs the length of the stationary guide 160 of FIG. 7. To facilitate ease of operation, the roller 170 rotates freely on the axle 172 in response to engagement with the upper end portion 30c of the rear wheel support 30 as it moves linearly relative to the front wheel support 20 during folding and unfolding of the stroller 10. In all other material respects, the fourth alternative embodiment of FIGS. 8A–8C functions substantially as described above for the third embodiment of FIG. 7. In alternative embodiments not illustrated, the roller 170 can be replaced with a non-rotating guide post. Further, the roller 170 or the guide post need not use the circumferential groove 174.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A foldable baby stroller, comprising:

a front wheel;

left and right side laterally spaced-apart front wheel supports, each of said left and right side front wheel supports having a forward end and a rearward end, said front wheel being mounted to said forward end of at least one of said front wheel supports;

left and right rear wheels;

left and right side laterally spaced-apart rear wheel supports, each of said left and right side rear wheel supports having a lower end and an upper end portion with an upper end, said lower ends being attached to at least one of said left and right rear wheels, said left and right side rear wheel supports being rotatable as a unit;

left and right side laterally spaced-apart handle members, each of said left and right side handle members having a forward end and a rearward end with a handle portion, said left and right side handle members being rotatable as a unit; and left and right side laterally spaced-apart folding assemblies, each of said left and right side folding assemblies having a mounting member and a guide pivotally attached to said mounting member and rotatable relative thereto, said rearward end of a corresponding one of said left and right side front wheel supports being fixedly attached to said mounting member, said forward end of a corresponding one of said left and right side handle members being pivotally attached to said mounting member and rotatable relative to said corresponding front wheel support, said left and right side handle members being rotatable as a unit in first and second sequential rotational movements from an unfolded position extending rearwardly and upwardly from said folding assembly to a folded position extending forwardly from said folding assembly and adjacent to an upper side of said corresponding front wheel support, said upper end portion of a corresponding one of said left and right side rear wheel supports being positioned at said mounting member with said upper end being pivotally attached to said forward end of said corresponding handle member for application of a drive force thereto by said corresponding handle member, said guide having an aperture therethrough with said upper end portion of said corresponding rear wheel support slidably disposed in said guide aperture, said guide and said guide aperture being configured to rotate said upper end portion of said corresponding rear wheel support with rotation of said corresponding handle member in response to said drive force applied to said upper end of said corresponding rear wheel support during both said first and second rotational movements of said corresponding handle member, and to slide said upper end portion of said corresponding rear wheel support in said guide aperture with rotation of said corresponding handle member in response to said drive force applied to said upper end of said corresponding rear wheel support during said second rotational movement of said corresponding handle member, said rotation and sliding movement of said upper end portion of said corresponding rear wheel support moving said corresponding rear wheel support from an unfolded position extending rearwardly and downwardly from said folding assembly to a folded position extending forwardly from said folding assembly and adjacent to a lower side of said corresponding front wheel support.

2. The baby stroller of claim 1 wherein said forward end of said corresponding handle member is pivotally attached to said mounting member by a pivot member attached to said forward end at a position spaced rearward of a free end portion of said forward end, said left and right side folding assemblies each include a stop mounted to said mounting member and having a recess sized and positioned to receive said free end portion of said corresponding handle member at least partially therein when said corresponding handle member is rotated into said unfolded position, and wherein said guide has a recess opposing said stop recess and sized and positioned to receive said free end portion of said corresponding handle member at least partially therein when said guide has been rotated by said drive force applied to said upper end of said corresponding rear wheel support when said corresponding handle member is rotated into said unfolded position.

3. The baby stroller of claim 2 wherein said stop is positioned above said free end portion of said corresponding handle member when said corresponding handle member is rotated into said unfolded position and said guide is positioned therebelow, said forward end of said corresponding handle member being pivotally attached to said mounting member at a location such that a downward force applied to said handle portion of said corresponding handle member when rotated into said unfolded position applies an upward force on said free end portion of said corresponding handle member to drive said free end portion firmly into said stop recess.

4. The baby stroller of claim 2 wherein said guide is pivotally attached to said mounting member at a location such that a downward force applied to said handle portion of said corresponding handle member when rotated into said unfolded position applies a rotational force to said guide to drive said guide firmly into said stop, with said free end portion of said corresponding handle member in said guide recess, thereby tightly clamping said free end portion between said stop and said guide.

5. The baby stroller of claim 1 wherein said left and right side folding assemblies each include a stop mounted to said mounting member and wherein said guide is pivotally attached to said mounting member at a position to engage said stop and have the rotational movement of said guide limited thereby when said guide has been rotated by said drive force applied to said upper end of said corresponding rear wheel support when said corresponding handle member is rotated into said unfolded position, such that a downward force applied to said handle portion of said corresponding handle member when rotated into said unfolded position applies a force on said guide to drive said guide firmly into engagement with said stop.

6. The baby stroller of claim 1 wherein said forward end of said corresponding handle member is pivotally connected to a rearward end of said corresponding front wheel support.

7. The baby stroller of claim 1, further including left and right side latch members, each of said left and right side latch members having a forward end attached to a corresponding one of said front wheel supports and a rearward end attached to a corresponding one of said rear wheel supports, said left and right side latch members being movable into a locked position, when in said locked position said left side latch member holding said left side front and rear wheel supports latched at a desired spacing when said handle members are rotated into said unfolded position and said right side latch member holding said right side front and rear wheel supports latched at a desired spacing when said handle members are rotated into said unfolded position.

8. The baby stroller of claim 7 wherein said Left and right side latch members are selectively releasable from said locked position to permit said left side front and rear wheel supports to move toward each other and to permit said right side front and rear wheel supports to move toward each other as said handle members are rotated into said folded position.

9. The baby stroller of claim 8 wherein each of said left and right side latch members includes a forward arm having a forward end comprising a corresponding one of said forward end of said left and right side latch members pivotally attached to a corresponding one of said front wheel supports and a rearward end, and a rearward arm having a forward end and a rearward end comprising a corresponding one of said rearward end of said left and right side latch members pivotally attached to a corresponding one of said rear wheel supports, said rearward end of said forward arm and said forward end of said rearward arm being releasably locked together when in said locked position.

10. The baby stroller of claim 7 wherein said left and right side latch members are selectively held in said locked position by at least one lock member.

11. The baby stroller of claim 10, further including an actuator member operatively connected to said left and right side latch members and spanning between said rearward ends thereof, and wherein selective movement of said actuator member selectively locks and unlocks said lock member.

12. The baby stroller of claim 11 wherein said actuator member is sized and positioned to be grasped from a position rearward of said handle members by the hand of a user, and operable to serve as a handle for lifting of the baby stroller.

13. The baby stroller of claim 12 wherein said actuator member is pivotally attached to said left and right side latch members to pivot between a lowered position whereat said latch members are in said locked position and a raised position whereat said latch members are in an unlocked position.

14. The baby stroller of claim 11, further including a basket suspended from said latch members and said actuator member.

15. The baby stroller of claim 1 wherein each of said left and right side mounting members includes a pair of inward and outward laterally spaced-apart mounting plates with said guide pivotally attached between said plates and rotatable relative thereto, said rearward end of said corresponding front wheel support being fixedly attached between said plates, said forward end of said corresponding handle member being pivotally attached between said plates for rotation relative to said corresponding front wheel support, and said upper end portion of said corresponding rear wheel support being positioned between said plates with said upper end being pivotally attached to said forward end of said corresponding handle support for application of said drive force thereto by said corresponding handle member.

16. A foldable baby stroller, comprising:
   a front wheel;
   left and right side laterally spaced-apart front wheel supports, each of said left and right side front wheel supports having a forward end and a rearward end, said front wheel being mounted to said forward end of at least one of said front wheel supports;
   a laterally extending rear axle, said axle having left and right ends;
   a left rear wheel mounted to said left axle end;
   a right rear wheel mounted to said right axle end;
   left and right side laterally spaced-apart rear wheel supports, each of said left and right side rear wheel supports having a lower end and an upper end portion with an upper end, said lower ends being attached to said rear axle, said left and right side rear wheel supports being rotatable as a unit;
   left and right side laterally spaced-apart handle supports, each of said left and right side handle supports having a forward end and a rearward end;
   a handle spanning between and fixedly attached to said rearward ends of said left and right side handle supports, said left and right side handle supports being rotatable as a unit; and
   left and right side laterally spaced-apart folding assemblies, each of said left and right side folding assemblies having a mounting plate and a guide pivotally attached to said plate and rotatable relative thereto, said rearward end of a corresponding one of said left and right side front wheel supports being fixedly attached to said plate, said forward end of a corresponding one of said left and right side handle supports being pivotally attached to said plate and rotatable relative to said corresponding front wheel support, said left and right side handle supports being rotatable as a unit in first and second sequential rotational movements from an unfolded position extending rearwardly and upwardly from said folding assembly to a folded position extending forwardly from said folding assembly and adjacent to an upper side of said corresponding front wheel support, said upper end portion of a corresponding one of said left and right side rear wheel supports being positioned at said plate with said upper end being pivotally attached to said forward end of said corresponding handle support for application of a drive force thereto by said corresponding handle support, said guide having an aperture therethrough with said upper end portion of said corresponding rear wheel support slidably disposed in said guide aperture, said guide and said guide aperture being configured to rotate said upper end portion of said corresponding rear wheel support with rotation of said corresponding handle support in response to said drive force applied to said upper end of said corresponding rear wheel support during both said first and second rotational movements of said corresponding handle support, and to slide said upper end portion of said corresponding rear wheel support in said guide aperture with rotation of said corresponding handle support in response to said drive force applied to said upper end of said corresponding rear wheel support during said second rotational movement of said corresponding handle support, said rotation and sliding movement of said upper end portion of said corresponding rear wheel support moving said corresponding rear wheel support from an unfolded position extending rearwardly and downwardly from said folding assembly to a folded position extending forwardly from said folding assembly and adjacent to a lower side of said corresponding front wheel support.

17. A foldable baby stroller frame for use with at least one front wheel and at least one rear wheel, comprising:
   left and right side laterally spaced-apart front wheel supports, each of said left and right side front wheel supports having a forward end and a rearward end, said forward ends of said front wheel supports having a mounting portion configured for mounting of the at least one front wheel thereto;
   left and right side laterally spaced-apart rear wheel supports, each of said left and right side rear wheel supports having a lower end and an upper end, said lower ends having a mounting portion configured for mounting of the at least one rear wheel thereto, said left and right side rear wheel supports being rotatable as a unit;
   left and right side laterally spaced-apart handle members, each of said left and right side handle members having a forward end and a rearward end, said left and right side handle members being rotatable as a unit; and
   left and right side laterally spaced-apart folding assemblies, each of said left and right side folding assemblies having said forward end of a corresponding one of said left and right side handle members pivotally attached for rotation relative to a corresponding one of said left and right side front wheel supports as said left and right side handle members rotate as a unit from an unfolded position extending rearwardly and upwardly from said folding assemblies to a folded position extending forwardly from said folding assemblies and adjacent to said front wheel supports, each of said left and right side folding assemblies further having said upper end of a corresponding one of said left and right side rear wheel supports pivotally attached for rotation relative to a corresponding one of said left and right side front wheel supports as said left and right side handle members rotate as a unit from said unfolded position to said folded position, each of said left and right side folding assemblies transmitting a driving force from said corresponding handle member to said corresponding rear wheel support to rotate said corresponding rear wheel support during rotational movement of said corresponding handle member, said rotation of said rear wheel supports moving said rear wheel supports as a unit from an unfolded position extending rearwardly and downwardly from said folding assemblies to a folded position extending forwardly from said folding assemblies and adjacent to said front wheel supports each of said left and right side rear wheel supports having an elongated upper end portion with a longitudinal axis, and each of said left and right side folding assemblies further retaining said upper end portion of said corresponding rear wheel support for longitudinal movement along said upper end portion longitudinal axis as said left and right side handle members rotate as a unit from said unfolded position to said folded position each of said left and right side folding assemblies transmitting said drive force from said handle member to said corresponding rear wheel support to longitudinally move said corresponding rear wheel supports during rotational movement of said corresponding handle member, resulting in both a longitudinal movement and a rotational movement of said corresponding rear wheel support, said resulting longitudinal and rotational movements of said corresponding rear wheel support moving said corresponding rear wheel supports as a unit from said unfolded position to said folded position, each of said left and right side folding assemblies including a pivoting guide member having an aperture therethrough with said upper end portion of said corresponding rear wheel support slidably disposed therein said guide and guide aperture being configured to rotate said upper end portion of said corresponding rear wheel support with rotation of said corresponding handle member in response to said drive force applied to said corresponding rear wheel support and to slide said upper end portion of said corresponding rear wheel support in said guide aperture with rotation of said corresponding handle member in response to said drive force applied to said corresponding rear wheel support as said left and right side handle members rotate as a unit from said unfolded position to said folded position.

18. A foldable baby stroller frame for use with at least one front wheel and at least one rear wheel, comprising:

left and right side laterally spaced-apart front wheel supports, each of said left and right side front wheel supports having a forward end and a rearward end, said forward ends of said front wheel supports having a mounting portion configured for mounting of the at least one front wheel thereto;

left and right side laterally spaced-apart rear wheel supports, each of said left and right side rear wheel supports having a lower end and an upper end, said lower ends having a mounting portion configured for mounting of the at least one rear wheel thereto, said left and right side rear wheel supports being rotatable as a unit;

left and right side laterally spaced-apart handle members, each of said left and right side handle members having a forward end and a rearward end, said left and right side handle members being rotatable as a unit; and left and right side laterally spaced-apart folding assemblies, each of said left and right side folding assemblies having said forward end of a corresponding one of said left and right side handle members pivotally attached for rotation relative to a corresponding one of said left and right side front wheel supports as said left and right side handle members rotate as a unit from an unfolded position extending rearwardly and upwardly from said folding assemblies to a folded position extending forwardly from said folding assemblies and adjacent to said front wheel supports, each of said left and right side folding assemblies further having said upper end of a corresponding one of said left and right side rear wheel supports pivotally attached for rotation relative to a corresponding one of said left and right side front wheel supports as said left and right side handle members rotate as a unit from said unfolded position to said folded position, each of said left and right side folding assemblies transmitting a driving force from said corresponding handle member to said corresponding rear wheel support to rotate said corresponding rear wheel support during rotational movement of said corresponding handle member, said rotation of said rear wheel supports moving said rear wheel supports as a unit from an unfolded position extending rearwardly and downwardly from said folding assemblies to a folded position extending forwardly from said folding assemblies and adjacent to said front wheel supports said folding assemblies each including a gear attached to said forward end of each of said handle members and a gear attached to said upper end of each of said rear wheel supports, said handle member gear and said rear wheel support gear of corresponding ones of said handle members and said rear wheel supports being drivably engaged to transmit said driving force from said corresponding handle member to said corresponding rear wheel support to rotate said corresponding rear wheel support during rotational movement of said corresponding handle member.

19. A foldable baby stroller frame for use with at least one front wheel and at least one rear wheel, comprising:

left and right side laterally spaced-apart front wheel supports, each of said left and right side front wheel supports having a forward end and a rearward end, said forward ends of said front wheel supports having a mounting portion configured for mounting of the at least one front wheel thereto;

left and right side laterally spaced-apart rear wheel supports, each of said left and right side rear wheel supports having a lower end and an upper end, said lower ends having a mounting portion configured for mounting of the at least one rear wheel thereto, said left and right side rear wheel supports being rotatable as a unit;

left and right side laterally spaced-apart handle members, each of said left and right side handle members having a forward end and a rearward end, said left and right side handle members being rotatable as a unit; and left and right side laterally spaced-apart folding assemblies, each of said left and right side folding assemblies having said forward end of a corresponding one of said left and right side handle members pivotally attached for rotation relative to a corresponding one of said left and right side front wheel supports as said left and right side handle members rotate as a unit from an unfolded position extending rearwardly and upwardly from said folding assemblies to a folded position extending forwardly from said folding assemblies and adjacent to said front wheel supports each of said left and right side folding assemblies further having said upper end of a corresponding one of said left and right side rear wheel supports pivotally attached for rotation relative to a corresponding one of said left and right side front wheel supports as said left and right side handle members rotate as a unit from said unfolded position to said folded position, each of said left and right side folding assemblies transmitting a driving force from said corresponding handle member to said corresponding rear wheel support to rotate said corresponding rear wheel support during rotational movement of said corresponding handle member, said rotation of said rear wheel supports moving said rear wheel supports as a unit from an unfolded position extending rearwardly and downwardly from said folding assemblies to a folded position extending forwardly from said folding assemblies and adjacent to said front wheel supports said folding assemblies each including a planetary gear assembly having an idler gear, a sun gear and a ring gear, said forward end of each of said handle members being attached to a first one of said idler, sun and ring gears of said corresponding folding assembly, said upper end of each of said rear wheel supports being attached to a different second one of said idler, sun and ring gears of said corresponding folding assembly, and said rearward end of each of said front wheel supports being attached to a yet different third one of said idler, sun and ring gears of said corresponding folding assembly to transmit said driving force from said corresponding handle member to said corresponding rear wheel support to rotate said corresponding rear wheel support during rotational movement of said corresponding handle member.

20. A foldable baby stroller frame for use with at least one front wheel and at least one rear wheel, comprising:

left and right side laterally spaced-apart first members, each of said first members having a first end portion and a second end portion;

left and right side laterally spaced-apart second members, each of said second members having a first end portion and a second end portion;

left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;

left and right side laterally spaced-apart first couplers, each of said first couplers being attached to a corresponding one of said first members to permit said corresponding first member to rotate about said second end thereof relative to a corresponding one of said second members between a folded position and an unfolded position;

left and right side laterally spaced-apart second couplers, each of said second couplers operatively connecting said corresponding first member and a corresponding one of said third members to transmit a driving force from said corresponding first member to said corresponding third member as said corresponding first member rotates between said folded position and said unfolded position thereof; and left and right side laterally spaced-apart third couplers, each of said third couplers engaging said corresponding third member and retaining said corresponding third member for both rotational movement about said second end portion thereof and linear movement relative to said corresponding second member in response to said driving force transmitted thereto by said corresponding first member as said corresponding first member rotates between said folded position and said unfolded position thereof, resulting in both a rotational movement and a linear movement of said corresponding third member, said resulting rotational and linear movements of said corresponding third member moving said corresponding third member between an unfolded position and a folded position.

21. A foldable baby stroller frame for use with at least one front wheel and at least one rear wheel, comprising:

left and right side laterally spaced-apart first members, each of said first members having a first end portion and a second end portion;

left and right side laterally spaced-apart second members, each of said second members having a first end portion and a second end portion;

left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;

left and right side laterally spaced-apart folding assemblies, each of said folding assemblies rotatably retaining a corresponding one of said first members for rotation portion thereof relative to a corresponding one of said second members between a folded position adjacent to said corresponding second member on a first side thereof and an unfolded position, said corresponding first member rotating in a first rotational direction when moving from said unfolded position to said folded position and in an opposite second rotational direction when moving from said folded position to said unfolded position, each of said folding assemblies operatively retaining said corresponding first member and a corresponding one of said third members to transmit a driving force from said corresponding first member to said corresponding third member as said corresponding first member rotates between said folded position and said unfolded position thereof, each of said folding assemblies retaining said corresponding third member for both rotational movement about said second end portion thereof and linear movement relative to said corresponding second member in response to said driving force transmitted thereto by said corresponding first member as said corresponding first member rotates between said folded position and said unfolded position thereof, resulting in both a rotational movement and a linear movement of said corresponding third member, said resulting rotational and linear movements of said corresponding third member moving said corresponding third member between an unfolded position and a folded position adjacent to said corresponding second member on a second side thereof opposite said first side, said corresponding third member rotating in said second rotational direction when moving from said unfolded position to said folded position and in said first rotational direction when moving from said folded position to said unfolded position.

22. The baby stroller frame of claim 21 wherein said left and right side folding assemblies each retain said corresponding third member for longitudinal movement thereof.

23. The baby stroller frame of claim 22 wherein said left and right side folding assemblies each retain said corresponding third- member for simultaneous longitudinal movement thereof and rotational movement relative to said corresponding second member during at least a portion of said corresponding first member rotation between said folded position and said unfolded position thereof.

24. The baby stroller frame of claim 21 wherein said left and right side folding assemblies each include a pivot member, said second end portion of each of said first members is pivotally attached by said corresponding pivot member at a position spaced away from a free end portion of said second end portion, said left and right side folding assemblies each include a first stop having a recess sized and positioned to receive said free end portion of said corresponding first member at least partially therein when said corresponding first member is rotated into said unfolded position.

25. The baby stroller frame of claim 24 wherein said left and right side folding assemblies each include a second stop moved into a stop position in response to rotation of said corresponding first member into said unfolded position, said second stop having a recess opposing said first stop recess and sized and positioned to receive said free end portion of said corresponding first member at least partially therein when said corresponding first member is rotated into said unfolded position.

26. The baby stroller frame of claim 25 wherein said second stop is pivotally mounted for rotation into said stop position and at a location such that when in said stop position a continued force applied to said corresponding first member when rotated into said unfolded position tending to rotate said corresponding first member in said second rotational direction applies a rotational force to said second stop to drive said second stop firmly into said first stop, with said free end portion of said corresponding first member in said second stop recess, thereby tightly clamping said free end portion between said first stop and said second stop.

27. The baby stroller frame of claim 24 wherein said first stop is positioned above said free end portion of said corresponding first member when said corresponding first member is rotated into said unfolded position, said second end portion of said corresponding first member being pivotally attached by said pivot member at a location such that a downward force applied to said first end portion of said corresponding first member when rotated into said unfolded position applies an upward force on said free end portion of said corresponding first member to drive said free end portion firmly into said first stop recess.

28. The baby stroller frame of claim 21 wherein said left and right side folding assemblies each include a stop and a clamp movable into engagement with said stop by said drive force applied to said corresponding third member by said first member when said corresponding first member is rotated into said unfolded position, such that a continued force applied to said first end portion of said corresponding first member when rotated into said unfolded position tending to rotate said corresponding first member in said second rotational direction applies a force on said clamp to drive said clamp firmly into engagement with said stop.

29. The baby stroller frame of claim 21 wherein said second end portion of said corresponding first member is pivotally connected to said second end portion of said corresponding second member.

30. The baby stroller frame of claim 21, further including left and right side latch members, each of said left and right side latch members having a first end portion attached to a corresponding one of said second members and a second end portion attached to a corresponding one of said third members, said left and right side latch members being movable into a locked position, when in said locked position said left side latch member holding said left side second and third members latched at a desired spacing when said first members are rotated into said unfolded position and said right side latch member holding said right side second and third members latched at a desired spacing when said first members are rotated into said unfolded position.

31. The baby stroller frame of claim 30 wherein said left and right side latch members are selectively releasable from said locked position to permit said left side second and third members to move toward each other and to permit said right side second and third members to move toward each other as said first members are rotated into said folded position.

32. The baby stroller frame of claim 30 wherein said left and right side latch members are selectively held in said locked position by at least one lock member.

33. The baby stroller frame of claim 32, further including an actuator member operatively connected to and spanning between said left and right side latch members, and wherein selective movement of said actuator member selectively locks and unlocks said lock member.

34. The baby stroller frame of claim 33 wherein said actuator member is sized and positioned to be grasped from a position rearward of said first members by the hand of a user, and operable to serve as a handle for lifting of the baby stroller frame.

35. The baby stroller frame of claim 21 wherein said driving force transmitted by said corresponding first member is primarily a rotational force on said corresponding third member when said corresponding first member is rotatably moving in proximity with said unfolded position thereof and is primarily a longitudinal force on said corresponding third member when said corresponding first member is rotatably moving in proximity with said folded position.

36. The baby stroller frame of claim 21 wherein said left and right side folding assemblies each slidably retain said corresponding third member to permit said linear movement thereof relative to said corresponding second member.

37. The baby stroller frame of claim 21 wherein said left and right side folding assemblies each include a pivoting guide member rotatable relative to said corresponding second member, each said guide member having an aperture therethrough with said second end portion of said corresponding third member slidably disposed therein, said guide member and guide member aperture being configured to rotate said second end portion of said corresponding third member with rotation of said corresponding first member in response to said drive force applied to said corresponding third member and to slide said second end portion of said corresponding third member in said guide member aperture with rotation of said corresponding first member in response to said drive force applied to said corresponding third member as said first member rotates between said folded position and said unfolded position.

38. The baby stroller frame of claim 21 wherein said left and right side folding assemblies each include a guide member to engage and guide movement of said corresponding third member, said guide member being positioned and configured to guide said corresponding third member to rotate about said second end portion thereof and move linearly relative to said corresponding second member in response to said drive force applied to said corresponding third member as said first member rotates between said folded position and said unfolded position.

39. The baby stroller frame of claim 38 wherein said left and right side guide members are each stationary and said second end portion of said corresponding third member slidably engages said guide member.

40. The baby stroller frame of claim 38 wherein said left and right side guide members are each positioned spaced apart from said corresponding second member to define a passageway therebetween, said second end portion of said corresponding third member being positioned in said passageway and retained therein by said guide member.

41. The baby stroller frame of claim 38 wherein said left and right side guide members each have an engagement surface to engage said second end portion of said corresponding third member, said engagement surface having a groove therein sized to receive said second end portion of said corresponding third member therein.

42. The baby stroller frame of claim 21 wherein said left and right side folding assemblies each include a rotatable roller to rollably engage and guide movement of said corresponding third member, said guide roller being positioned to guide said corresponding third member to rotate about said second end portion thereof and move linearly relative to said corresponding second member in response to said drive force applied to said corresponding third member as said first member rotates between said folded position and said unfolded position.

43. A foldable baby stroller frame for use with at least one front wheel and at least one rear wheel, comprising:
   left and right side laterally spaced-apart first members, each of said first members having a first end portion and a second end portion;
   left and right side laterally spaced-apart second members, each of said second members having a first end portion and a second end portion;
   left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;
   left and right side laterally spaced-apart first couplers, each of said first couplers being attached to a corresponding one of said first members to permit said corresponding first member to rotate about said second end thereof relative to a corresponding one of said second members between a folded position and an unfolded position;
   left and right side laterally spaced-apart second couplers, each of said second couplers operatively connecting said corresponding first member and a corresponding one of said third members to transmit a driving force from said corresponding first member to said corresponding third member as said corresponding first member rotates between said folded position and said unfolded position thereof, said corresponding second and third members being free to move relative to each other without direct pivot link interconnection therebetween other than through said corresponding first member which controls movement of said corresponding third member between an unfolded position and a folded position; and
   left and right side laterally spaced-apart guides, each of said guides guiding said corresponding third member for both rotational movement about said second end portion thereof and linear movement relative to said corresponding second member in response to said driving force transmitted thereto by said corresponding first member as said corresponding first member rotates between said folded position and said unfolded position thereof, resulting in both a rotational movement and a linear movement of said corresponding third member, said resulting rotational and linear movements of said corresponding third member moving said corresponding third member between said unfolded position and said folded position.

44. A foldable baby stroller frame for use with at least one front wheel and at least one rear wheel, comprising:
   left and right side laterally spaced-apart first members, each of said first members having a first end portion and a second end portion;
   left and right side laterally spaced-apart second members, each of said second members having a first end portion and a second end portion;
   left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;
   said first members being rotatably retained for rotation about said second end thereof relative to a corresponding one of said second members between a folded position and an unfolded position;
   said first members each being operatively coupled to a corresponding one of said third members to transmit a driving force therebetween such that said corresponding third member is moved between a folded position and an unfolded position as said corresponding first member rotates between said first member folded position and said first member unfolded position, respectively; and
   left and right side laterally spaced-apart third member guides, each of said guides retaining said corresponding third member for both rotational movement about said second end portion thereof and linear movement relative to said corresponding second member to guide said corresponding third members between said third member folded position and said third member unfolded position as said corresponding first members rotate between said first member folded position and said first member unfolded position, respectively.

45. The baby stroller frame of claim 44 wherein each of said guides slidably retains said corresponding third member for said rotational and linear movements thereof.

46. The baby stroller frame of claim 44 including left and right pivot members, each rotatably retaining a corresponding one of said first members, said pivot members pivotally retaining said second end portion of said corresponding first members at a position spaced away from a free end portion of said second end portion, and the baby stroller further includes left and right side first stops positioned to engage said free end portion of said corresponding first member and limit further rotation of said first member beyond said unfolded position.

47. The baby stroller frame of claim 46 further including left and right side second stops, said second stop being moved into a stop position in response to rotation of said corresponding first member into said unfolded position, said second stop having a recess opposing a recess of said first stop, said first and second stop recesses in combination being sized and positioned to snugly receive said free end portion of said corresponding first member at least partially therein when said corresponding first member is rotated into said unfolded position.

48. The baby stroller frame of claim 46 wherein said first stop is positioned above said free end portion of said corresponding first member when said corresponding first member is rotated into said unfolded position, said second end portion of said corresponding first member being pivotally attached by said pivot member at a location such that a downward force applied to said first end portion of said corresponding first member when rotated into'said unfolded position applies an upward force on said free end portion of said corresponding first member to drive said free end portion firmly into said first stop recess.

49. The baby stroller frame of claim 44 wherein each of said guides retains said corresponding third members for longitudinal movement thereof.

50. The baby stroller frame of claim 49 wherein each of said guides retains said corresponding third member for simultaneous rotational movement thereof and linear movement relative to said corresponding second member while permitting longitudinal movement of said corresponding third member relative to a longitudinal axis thereof through at least a portion of said movement of said corresponding third member between said unfolded position and said folded position.

51. The baby stroller frame of claim 44 wherein each of said guides retains said corresponding third member for simultaneous rotational movement thereof and linear movement relative to said corresponding second member during at least a portion of said corresponding first member rotation between said folded position and said unfolded position thereof.

52. The baby stroller frame of claim 44 wherein said driving force transmitted by said corresponding first member is primarily a rotational force on said corresponding third member when said corresponding first member is rotatably moving in proximity with said unfolded position thereof and is primarily a longitudinal force on said corresponding third member when said corresponding first member is rotatably moving in proximity with said folded position.

53. The baby stroller frame of claim 44 wherein said left and right side guides each include a pivoting guide member rotatable relative to said corresponding second member, each said guide member having an aperture therethrough with said second end portion of said corresponding third member slidably disposed therein, said guide member and guide member aperture being configured to rotate said second end portion of said corresponding third member with rotation of said corresponding first member in response to said drive force applied to said corresponding third member and to slide said second end portion of said corresponding third member in said guide member aperture with rotation of said corresponding first member in response to said drive force applied to said corresponding third member as said first member rotates between said folded position and said unfolded position.

54. The baby stroller frame of claim 44 wherein said left and right side guides each include a guide member to engage and guide movement of said corresponding third member, said guide member being positioned and configured to guide said corresponding third member to rotate about said second end portion thereof and move linearly relative to said corresponding second member in response to said drive force applied to said corresponding third member as said first member rotates between said folded position and said unfolded position.

55. The baby stroller of claim 54 wherein said left and right side guide members are each stationary and said second end portion of said corresponding third member slidably engages said guide member.

56. The baby stroller frame of claim 54 wherein said left and right side guide members are each positioned spaced apart from said corresponding second member to define a passageway therebetween, said second end portion of said corresponding third member being positioned in said passageway and retained therein by said guide member.

57. The baby stroller frame of claim 54 wherein said left and right side guide members each have an engagement surface to engage said second end portion of said corresponding third member, said engagement surface having a groove therein sized to receive said second end portion of said corresponding third member therein.

58. The baby stroller frame of claim 44 wherein said left and right side guides each include a rotatable roller to rollably engage and guide movement of said corresponding third member, said guide roller being positioned to guide said corresponding third member to rotate about said second end portion thereof and move linearly relative to said corresponding second member in response to said drive force applied to said corresponding third member as said first member rotates between said folded position and said unfolded position.

59. The baby stroller frame of claim 44 wherein said second end portion of each said first member is pivotally connected to said second end portion of said corresponding third member.

60. The baby stroller frame of claim 44 wherein said second end portion of each said first member is pivotally connected to said second end portion of said corresponding second member.

61. The baby stroller frame of claim 44 further including left and right side latch members, each of said left and right side latch members having a first end portion attached to a corresponding one of said second members and a second end portion attached to a corresponding one of said third members, said left and right side latch members being movable into a locked position, when in said locked position, said left side latch member holding said left side second and third members latched at a desired spacing when said first members are rotated into said unfolded position and said right side latch member holding said right side second and third members latched at a desired spacing when said first members are rotated into said unfolded position.

62. The baby stroller frame of claim 61 wherein said left and right side latch members are selectively releasable from said locked position to permit said left side second and third members to move toward each other and to permit said right side second and third members to move toward each other as said first members are rotated into said folded position.

63. The baby stroller of claim 62 wherein said left and right side latch members are selectively held in said locked position by at least one lock members.

64. A foldable baby stroller frame for use with at least one front wheel and at least one rear wheel, comprising:

left and right side laterally spaced-apart first members, each of said first members having a first end portion and a second end portion;

left and right side laterally spaced-apart second members, each of said second members having a first end portion and a second end portion;

left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;

said first members being rotatable about said second end thereof relative to a corresponding one of said second members between a folded position and an unfolded position;

said first members each being operatively coupled to a corresponding one of said third members to transmit a driving force from said corresponding first member to said corresponding third member as said corresponding first member rotates between said first member folded position and said first member unfolded position; and left and right side laterally spaced-apart third member guides, each of said guides guidingly retaining said corresponding third member for movement between an unfolded position and a folded position as said corresponding first member rotates between said first member folded position and said first member unfolded position, respectively, each of said guides permitting said corresponding third member to move with both rotational movement about said second end portion thereof and linear movement relative to said corresponding second member in response to said driving force transmitted thereto by said corresponding first member, said driving force moving said corresponding third member with both said rotational movement and said linear movement to move said corresponding third member between said third member folded position and said third member unfolded position as said corresponding first member rotates between said first member folded position and said first member unfolded position, respectively.

65. The baby stroller frame of claim 64 wherein each of said guides retains said corresponding third members for longitudinal movement thereof.

66. The baby stroller frame of claim 64 wherein each of said guides retains said corresponding third member for simultaneous rotational movement thereof and linear movement relative to said corresponding second member during at least a portion of said corresponding first member rotation between said folded position and said unfolded position thereof.

67. A foldable baby stroller frame for use with at least one front wheel and at least one rear wheel, comprising:

left and right side laterally spaced-apart first members, each of said first members having a first end portion and a second end portion;

left and right side laterally spaced-apart second members, each of said second members having a first end portion and a second end portion;

left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;

said first members being rotatably mounted for rotation about said second end thereof relative to a corresponding one of said second members between a folded position and an unfolded position;

said first members each being operatively coupled to a corresponding one of said third members to transmit a driving force from said corresponding first member to said corresponding third member as said corresponding first member rotates between said first member folded position and said first member unfolded position; and left and right side third member guides, each of said guides guidingly retaining said corresponding third member for movement between an unfolded position and a folded position as said corresponding first member rotates between said first member folded position and said first member unfolded position, respectively, each of said guides permitting said corresponding third member to simultaneously move with both rotational movement about said second end portion thereof and longitudinal movement in response to said driving force transmitted thereto by said corresponding first member during at least a portion of said corresponding first member rotation between said first member folded position and said first member unfolded position, said driving force moving said corresponding third member with both said rotational movement and said longitudinal movement to move said corresponding third member between said third member folded position and said third member unfolded position as said corresponding first member rotates between said first member folded position and said first member unfolded position, respectively.

68. The baby stroller frame of claim 67 wherein each of said guides slidably retains said corresponding third member for said rotational and longitudinal movements thereof.

69. The baby stroller frame of claim 67 wherein said driving force transmitted by said corresponding first member is primarily a rotational force on said corresponding third member when said corresponding first member is rotatably moving in proximity with said unfolded position thereof and is primarily a longitudinal force on said corresponding third member when said corresponding first member is rotatably moving in proximity with said folded position.

70. The baby stroller frame of claim 67 wherein said left and right side guides each include a pivoting guide member rotatable relative to said corresponding second member, each said guide member having an aperture therethrough with said second end position of said corresponding third member slidably disposed therein, said guide member and guide member aperture being configured to rotate said second end portion of said corresponding third member with rotation of said corresponding first member in response to said drive force applied to said corresponding third member and to slide said second end portion of said corresponding third member in said guide member aperture with rotation of said corresponding first member in response to said drive force applied to said corresponding third member as said first member rotates between said folded position and said unfolded position.

71. The baby stroller frame of claim 67 wherein said left and right side guides each include a guide member to engage and guide movement of said corresponding third member, said guide member being positioned and configured to guide said corresponding third member to rotate about said second end portion thereof and move linearly relative to said corresponding second member in response to said drive force applied to said corresponding third member as said first member rotates between said folded position and said unfolded position.

72. The baby stroller of claim 71 wherein said left and right side guide members are each stationary and said second end portion of said corresponding third member slidably engages said guide member.

73. The baby stroller frame of claim 71 wherein said left and right side guide members are each positioned spaced apart from said corresponding second member to define a passageway therebetween, said second end portion of said corresponding third member being positioned in said passageway and retained therein by said guide member.

74. The baby stroller frame of claim 71 wherein said left and right side guide members each have an engagement surface to engage said second end portion of said corresponding third member, said engagement surface having a groove therein sized to receive said second end portion of said corresponding third member therein.

75. The baby stroller frame of claim 67 wherein said left and right side guides each include a rotatable roller to rollably engage and guide movement of said corresponding third member, said guide roller being positioned to guide said corresponding third member to rotate about said second end portion thereof and move linearly relative to said corresponding second member in response to said drive force applied to said corresponding third member as said first member rotates between said folded position and said unfolded position.

76. A foldable baby stroller frame for use with at least one front wheel and at least one rear wheel, comprising:

left and right side laterally spaced-apart first members, each of said first members having a first end portion and a second end portion;

left and right side laterally spaced-apart second members, each of said second members having a first end portion and a second end portion;

left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;

left and right side laterally spaced-apart first couplers, each of said first couplers being attached to a corresponding one of said first members to permit said corresponding first member to rotate about said second end thereof relative to a corresponding one of said second members between a folded position and an unfolded position;

left and right side laterally spaced-apart second couplers, each of said second couplers operatively connecting said corresponding first member and a corresponding one of said third members to transmit a driving force from said corresponding first member to said corresponding third member as said corresponding first member rotates between said folded position and said unfolded position thereof; and left and right side laterally spaced apart guides, each of said guides guiding said corresponding third member for both rotational movement about said second end portion thereof relative to said corresponding second member and linear movement relative to said corresponding second member in response to said driving force transmitted thereto by said corresponding first member as said corresponding first member rotates between said folded position and said unfolded position thereof, resulting in both a rotational movement and a linear movement of said corresponding third member, said resulting rotational and linear movements of said corresponding third member moving said corresponding third member between said unfolded position and said folded position.

77. The baby stroller frame of claim 76 wherein each of said guides slidably retains said corresponding third member for said rotational and linear movements thereof.

78. The baby stroller frame of claim 76 wherein said first couplers each include a pivot member, and said second end portion of each of said first members is pivotably retained by said corresponding pivot member at a position spaced away from a free end portion of said second end portion, and the baby stroller further includes left and right side stops positioned to engage said free end portion of said corresponding first member and limit further rotation of said first member beyond said unfolded position.

79. The baby stroller frame of claim 76 wherein each of said guides retains said corresponding third members for longitudinal moment thereof.

80. The baby stroller frame of claim 76 wherein each of said guides retains said corresponding third member for simultaneous rotational movement thereof and linear movement relative to said corresponding second member during at least a portion of said corresponding first member rotation between said folded position and said unfolded position thereof.

81. The baby stroller frame of claim 76 wherein each of said guides slidably retains said corresponding third member for longitudinal movement thereof through at least a portion of said movement of said corresponding third member between said unfolded position and said folded position.

82. The baby stroller frame of claim 76 wherein said left and right side guides each include a pivoting guide member rotatable relative to said corresponding second member, each said guide member having an aperture therethrough with said second end portion of said corresponding third member slidably disposed therein, said guide member and guide member aperture being configured to rotate said second end portion of said corresponding third member with rotation of said corresponding first member in response to said drive force applied to said corresponding third member and to slide said second end portion of said corresponding third member in said guide member aperture with rotation of said corresponding first member in response to said drive force applied to said corresponding third member as said first member rotates between said folded position and said unfolded position.

83. The baby stroller frame of claim 76 wherein said left and right side guides each include a guide member to engage and guide movement of said corresponding third member, said guide member being positioned and configured to guide said corresponding third member to rotate about said second end portion thereof and move linearly relative to said corresponding second member in response to said drive force applied to said corresponding third member as said first member rotates between said folded position and said unfolded position.

84. The baby stroller of claim 83 wherein said left and right side guide members are each stationary and said second end portion of said corresponding third member slidably engages said guide member.

85. The baby stroller frame of claim 83 wherein said left and right side guide members are each positioned spaced apart from said corresponding second member to define a passageway therebetween, said second end portion of said corresponding third member being positioned in said passageway and retained therein by said guide member.

86. The baby stroller frame of claim 83 wherein said left and right side guide members each have an engagement surface to engage said second end portion of said corresponding third member, said engagement surface having a groove therein sized to receive said second end portion of said corresponding third member therein.

87. The baby stroller frame of claim 83 wherein said left and right side guides each include a rotatable roller to rollably engage and guide movement of said corresponding third member, said guide roller being positioned to guide said corresponding third member to rotate about said second end portion thereof and move linearly relative to said corresponding second member in response to said drive force applied to said corresponding third member as said first member rotates between said folded position and said unfolded position.

88. The baby stroller of claim 76 wherein said second end portion of each said first member is pivotally connected to said second end portion of said corresponding third member.

89. The baby stroller frame of claim 76 wherein said second end portion of each said first member is pivotally connected to said second end portion of said corresponding second member.

90. The baby stroller frame of claim 76, further including left and right side latch members, each of said left and right side latch members having a first end portion attached to a corresponding one of said second members and a second end portion attached to a corresponding one of said third members, said left and right side latch members being movable into a locked position, when in said locked position said left side latch member holding said left side second and third members latched at a desired spacing when said first members are rotated into said unfolded position and said right side latch member holding said right side second and third members latched at a desired spacing when said first members are rotated into said unfolded position.

91. The baby stroller frame of claim 90 wherein said left and right side latch members are selectively releasable from said locked position to permit said left side second and third members to move toward each other and to permit said right side second and third members to move toward each other as said first members are rotated into said folded position.

92. The baby stroller frame of claim 91 wherein said left and right side latch members are selectively held in said locked position by at least one lock member.

93. The baby stroller frame of claim 92 including an actuator member operatively connected to and spanning between said left and right side latch members, and wherein selective movement of said actuator member selectively locks and unlocks said lock member.

94. The baby stroller frame of claim 93 wherein said actuator member is sized and positioned to be grasped from a position rearward of said first members by the hand of a user, and operable to serve as a handle for lifting of the baby stroller frame.

95. A foldable baby stroller frame for use with at least one front wheel and at least one rear wheel, comprising:

left and right side laterally spaced-apart first members, each of said first members having a first end portion and a second end portion;

left and right side laterally spaced-apart second members, each of said second members having a first end portion and a second end portion;

left and right side laterally spaced-apart third members, each of said third members having a first end portion and a second end portion, one of said first end portions of a first one of said first, second and third members having a mounting portion configured for mounting of the at least one front wheel thereto, one of said first end portions of a different second one of said first, second and third members having a mounting portion configured for mounting of the at least one rear wheel thereto, and one of said first end portions of a yet different third one of said first, second and third members having a handle portion;

left and right side laterally spaced-apart first couplers, each of said first couplers being attached to a corresponding one of said first members to permit said corresponding first member to rotate about said second end thereof relative to a corresponding one of said second members between a folded position and an unfolded position;

left and right side laterally spaced-apart second couplers, each of said second couplers operatively connecting said corresponding first member and a corresponding one of said third members to transmit a driving force from said corresponding first member to said corresponding third member as said corresponding first member rotates between said folded position and said unfolded position thereof; and left and right side laterally spaced-apart guides, each of said guides guiding said corresponding third member for both rotational movement about ,aid second end portion thereof relative to said corresponding second member and longitudinal movement along a longitudinal axis of said second end portion of said corresponding third member in response to said driving force transmitted thereto by said corresponding first member as said corresponding first member rotates between said folded position and said unfolded position thereof, resulting in both a rotational movement and a longitudinal movement of said corresponding third member, said resulting rotational and longitudinal movements of said corresponding third member moving said corresponding third member between said unfolded position and said folded position.

96. The baby stroller of claim 1 wherein said forward end of said corresponding handle member is pivotally attached to said mounting member by a pivot member attached to said forward end at a position spaced rearward of a free end portion of said forward end, said left and right side folding assemblies each include a stop positioned to engage said free end portion of said corresponding handle member when said corresponding handle member is rotated into said unfolded position.

97. The baby stroller of claim 96 wherein said stop is positioned above said free end portion of said corresponding handle member when said corresponding handle member is rotated into said unfolded position, said forward end of said corresponding handle member being pivotally attached to said mounting member at a location such that a downward force applied to said handle portion of said corresponding handle member when rotated into said unfolded position applies an upward force on said free end portion of said corresponding handle member to drive said free end portion firmly against said stop.

98. The baby stroller of claim 96, wherein said guide has an engagement portion opposing said stop and positioned to engage said free end portion of said corresponding handle member when said guide has been rotated by said drive force applied to said upper end of said corresponding rear wheel support when said corresponding handle member is rotated into said unfolded position, and wherein said guide is pivotally attached to said mounting member at a location such that a downward force applied to said handle portion of said corresponding handle member when rotated into said unfolded position applies a rotational force to said guide to drive said guide engagement portion firmly into engagement with said free end portion of said corresponding handle member to thereby tightly clamp said free end portion between said stop and said guide engagement portion.

99. The baby stroller frame of claim 21 wherein said left and right side folding assemblies each include a pivot member, said second end portion of each of said first members is pivotally attached by said corresponding pivot member at a position spaced away from a free end portion of said second end portion, said left and right side folding assemblies each include a first stop positioned to engage said free end portion of said corresponding first member when said corresponding first member is rotated into said unfolded position.

100. The baby stroller frame of claim 99 wherein said left and right side folding assemblies each include a second stop moved into a stop position in response to rotation of said corresponding first member into said unfolded position, when in said stop position said second stop opposes said first stop and is positioned to engage said free end portion of said corresponding first member when said corresponding first member is rotated into said unfolded position.

101. The baby stroller frame of claim 100 wherein said second stop is pivotally mounted for rotation into said stop position and at a location such that when in said stop position a continued force applied to said corresponding first member when rotated into said unfolded position tending to rotate said corresponding first member in said second rotational direction applies a rotational force to said second stop to drive said second stop firmly into engagement with said free end portion of said corresponding first member to thereby tightly clamp said free end portion between said first stop and said second stop.

102. The baby stroller frame of claim 99 wherein said first stop is positioned above said free end portion of said corresponding first member when said corresponding first member is rotated into said unfolded position, said second end portion of said corresponding first member being pivotally attached by said pivot member at a location such that a downward force applied to said first end portion of said corresponding first member when rotated into said unfolded position applies an upward force on said free end portion of said corresponding first member to drive said free end portion firmly against said first stop.

103. The baby stroller frame of claim 46 further including left and right side second stops, said second stop being moved into a stop position in response to rotation of said corresponding first member into said unfolded position, when in said stop position said second stop opposes said first stop, said first and second stops being positioned to receive said free end portion of said corresponding first member therebetween when said corresponding first member is rotated into said unfolded position.

104. The baby stroller frame of claim 46 wherein said first stop is positioned above said free end portion of said corresponding first member when said corresponding first member is rotated into said unfolded position, said second end portion of said corresponding first member being pivotally attached by said pivot member at a location such that a downward force applied to said first end portion of said corresponding first member when rotated into said unfolded position applies an upward force on said free end portion of said corresponding first member to drive said free end portion firmly against said first stop.

* * * * *

UNITED STATES PATENT AND TRADEMARK OFFICE
CERTIFICATE OF CORRECTION

PATENT NO. : 6,105,998
DATED : August 22, 2000
INVENTOR(S) : Baechler et al.

It is certified that error appears in the above-identified patent and that said Letters Patent is hereby corrected as shown below:

Column 23, claim 17,
Line 7, "folded position each" should read -- Folded position, each --.
Line 22, "disposed therein said" should read -- disposed therein, said --.

Column 24, claim 18,
Line 14, "supports said" should read -- supports, said --.

Column 24, claim 19,
Line 54, "wheel supports each" should read -- wheel supports, each --.

Column 25, claim 19,
Line 5, "supports said" supports said" should read -- support, said --.

Column 26, claim 21,
Line 28, "rotation portion" should read as -- rotation about said second end portion --.

Column 31, claim 48,
Line 18, "rotated into' said" should read as -- rotated into said --.

Column 34, claim 70,
Line 56, "end position" should read -- end portion --.

Column 36, claim 79,
Line 35, "longitudinal moment" should read -- longitudinal movement --.

UNITED STATES PATENT AND TRADEMARK OFFICE
CERTIFICATE OF CORRECTION

PATENT NO. : 6,105,998
DATED : August 22, 2000
INVENTOR(S) : Baechler et al.

It is certified that error appears in the above-identified patent and that said Letters Patent is hereby corrected as shown below:

Column 37, claim 93,
Line 61, "claim 92 including" should read -- claim 92, further including --.

Column 38, claim 95,
Line 42, "about ,aid" should read -- about said --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*